(12) United States Patent
Tanaka

(10) Patent No.: US 7,294,589 B2
(45) Date of Patent: Nov. 13, 2007

(54) LASER IRRADIATION APPARATUS

(75) Inventor: Koichiro Tanaka, Atsugi (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 134 days.

(21) Appl. No.: 10/136,374

(22) Filed: May 2, 2002

(65) Prior Publication Data

US 2002/0151121 A1    Oct. 17, 2002

Related U.S. Application Data

(62) Division of application No. 09/481,396, filed on Jan. 12, 2000, now Pat. No. 6,961,361.

(30) Foreign Application Priority Data

May 24, 1999    (JP) ................................ 11-144064

(51) Int. Cl.
H01L 21/477 (2006.01)
H01L 21/324 (2006.01)
H01L 21/42 (2006.01)
H01L 21/26 (2006.01)

(52) U.S. Cl. ............................ 438/795; 257/E21.347

(58) Field of Classification Search ................ 438/166, 438/378, 662, 795, 150, 168, 187, 198, 308, 438/482, 486–488; 257/E21.347
See application file for complete search history.

(56) References Cited

U.S. PATENT DOCUMENTS

| | | | |
|---|---|---|---|
| 3,670,260 A | 6/1972 | Koester et al. | |
| 4,262,208 A | 4/1981 | Suzki et al. | |
| 4,734,550 A | 3/1988 | Imamura et al. | |
| 4,851,978 A | 7/1989 | Ichihara | |
| 4,861,964 A | 8/1989 | Sinohara | |
| 4,937,459 A | 6/1990 | Ina | |
| 4,942,588 A | 7/1990 | Yasui et al. | |
| 5,059,013 A * | 10/1991 | Jain | ............................ 359/503 |
| 5,062,942 A * | 11/1991 | Kambara et al. | ........... 204/612 |
| RE33,947 E | 6/1992 | Shinohara | |

(Continued)

FOREIGN PATENT DOCUMENTS

DE    4004423    8/1990

(Continued)

OTHER PUBLICATIONS

Merriam-Websters Collegiate Dictionary Tenth Edition.*

(Continued)

*Primary Examiner*—Michael B. Lebentritt
*Assistant Examiner*—Stanetta Isaac
(74) *Attorney, Agent, or Firm*—Eric J. Robinson; Robinson Intellectual Property Law Office, P.C.

(57) ABSTRACT

An object is to obtain an even energy distribution of a laser beam in one direction, thereby conducting a uniform laser annealing on a film.

A laser irradiation apparatus comprising: a lens for dividing a laser beam in one direction; and an optical system for overlapping the divided laser beam, characterized in that the shape of the laser beam entering into the lens has edges vertical to the above-mentioned direction.

48 Claims, 24 Drawing Sheets

U.S. PATENT DOCUMENTS

| | | | | |
|---|---|---|---|---|
| 5,548,444 A | * | 8/1996 | McLaughlin et al. | 359/629 |
| 5,561,081 A | * | 10/1996 | Takenouchi et al. | 438/166 |
| 5,591,668 A | * | 1/1997 | Maegawa et al. | 438/799 |
| 5,608,492 A | | 3/1997 | Sato | |
| 5,643,826 A | | 7/1997 | Ohtani et al. | |
| 5,708,252 A | | 1/1998 | Shinohra et al. | |
| 5,721,416 A | | 2/1998 | Burghardt et al. | |
| 5,798,784 A | | 8/1998 | Nonaka et al. | |
| 5,815,494 A | | 9/1998 | Yamazaki et al. | |
| 5,858,473 A | | 1/1999 | Yamazaki et al. | |
| 5,858,822 A | | 1/1999 | Yamazaki et al. | |
| 5,879,977 A | | 3/1999 | Zhang et al. | |
| 5,897,799 A | | 4/1999 | Yamazaki et al. | |
| 5,900,980 A | * | 5/1999 | Yamazaki et al. | 359/619 |
| 5,923,960 A | * | 7/1999 | Harvey | 438/131 |
| 5,923,962 A | | 7/1999 | Ohtani et al. | |
| 5,959,779 A | | 9/1999 | Yamazaki et al. | |
| 5,968,383 A | | 10/1999 | Yamazaki et al. | |
| 6,002,101 A | | 12/1999 | Yamazaki et al. | |
| 6,002,523 A | | 12/1999 | Tanaka | |
| 6,008,144 A | * | 12/1999 | Shih et al. | 438/795 |
| 6,038,075 A | | 3/2000 | Yamazaki et al. | |
| 6,061,375 A | | 5/2000 | Zhang et al. | |
| 6,071,765 A | * | 6/2000 | Noguchi et al. | 438/166 |
| 6,100,961 A | | 8/2000 | Shiraishi et al. | |
| 6,104,535 A | | 8/2000 | Tanaka | |
| 6,136,632 A | | 10/2000 | Higashi | |
| 6,137,633 A | | 10/2000 | Tanaka | |
| 6,157,492 A | | 12/2000 | Yamazaki et al. | |
| 6,159,777 A | | 12/2000 | Takenouchi et al. | |
| 6,160,827 A | | 12/2000 | Tanaka | |
| 6,168,968 B1 | | 1/2001 | Umemoto et al. | |
| 6,172,820 B1 | * | 1/2001 | Kuwahara | 359/719 |
| 6,176,926 B1 | | 1/2001 | Tanaka | |
| 6,184,490 B1 | | 2/2001 | Schweizer | |
| 6,212,012 B1 | | 4/2001 | Tanaka | |
| 6,215,595 B1 | | 4/2001 | Yamazaki et al. | |
| 6,239,913 B1 | | 5/2001 | Tanaka | |
| 6,246,524 B1 | | 6/2001 | Tanaka | |
| 6,249,385 B1 | | 6/2001 | Yamazaki et al. | |
| 6,259,512 B1 | | 7/2001 | Mizouchi | |
| 6,261,856 B1 | | 7/2001 | Shinohara et al. | |
| 6,291,320 B1 | | 9/2001 | Yamazaki et al. | |
| 6,300,176 B1 | | 10/2001 | Zhang et al. | |
| 6,300,594 B1 | * | 10/2001 | Kinoshita et al. | 219/121.69 |
| 6,304,385 B1 | | 10/2001 | Tanaka | |
| 6,323,937 B1 | | 11/2001 | Sano | |
| 6,353,218 B1 | | 3/2002 | Yamazaki et al. | |
| 6,353,244 B1 | | 3/2002 | Yamazaki et al. | |
| 6,372,039 B1 | * | 4/2002 | Okumura et al. | 117/8 |
| 6,388,386 B1 | * | 5/2002 | Kunii et al. | 315/169.3 |
| 6,392,810 B1 | | 5/2002 | Tanaka | |
| 6,429,100 B2 | * | 8/2002 | Yoneda | 438/487 |
| 6,437,313 B2 | | 8/2002 | Yamazaki et al. | |
| 6,507,446 B2 | | 1/2003 | Yamashita et al. | |
| 6,521,492 B2 | * | 2/2003 | Miyasaka et al. | 438/166 |
| 6,528,397 B1 | * | 3/2003 | Taketomi et al. | 438/487 |
| 2001/0015854 A1 | | 8/2001 | Yamazaki et al. | |
| 2002/0117630 A1 | | 8/2002 | Yamazaki et al. | |
| 2002/0146873 A1 | | 10/2002 | Tanaka | |
| 2003/0040146 A1 | * | 2/2003 | Kang et al. | 438/166 |
| 2003/0042430 A1 | | 3/2003 | Tanaka et al. | |

FOREIGN PATENT DOCUMENTS

| | | |
|---|---|---|
| EP | 0 653 720 | 5/1995 |
| GB | 2228344 | 8/1990 |
| JP | 60-005578 | 1/1985 |
| JP | 03-226392 | 10/1991 |
| JP | 6-244104 | 9/1994 |
| JP | 7-130652 | 5/1995 |
| JP | 11-054426 | 2/1999 |
| JP | 11-102862 | 4/1999 |
| JP | 11-133463 | 5/1999 |

OTHER PUBLICATIONS

Specification, Drawings and Pending Claims of U.S. Appl. No. 09/481,396 entitled Laser Irradiation Apparatus filed Jan. 12, 2000.

Specification, Drawings and Allowed Claims of U.S. Appl. No. 09/843,714 entitled Beam Homogenizer, Laser Irradiation Apparatus, Laser Irradiation Method, and Method of Manufacturing Semiconductor Device filed Apr. 30, 2001.

European Search Report dated Jun. 4, 2002.

European Search Report (Application No. 06014760.0) dated Oct. 30, 2006.

* cited by examiner

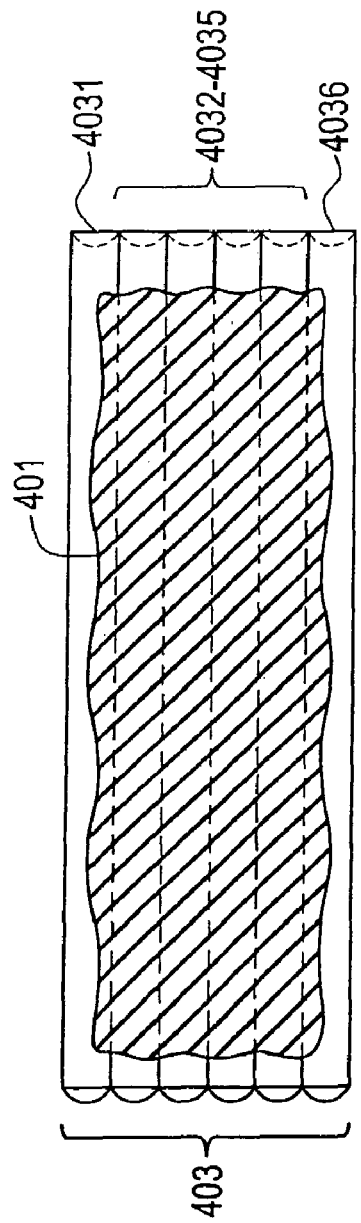
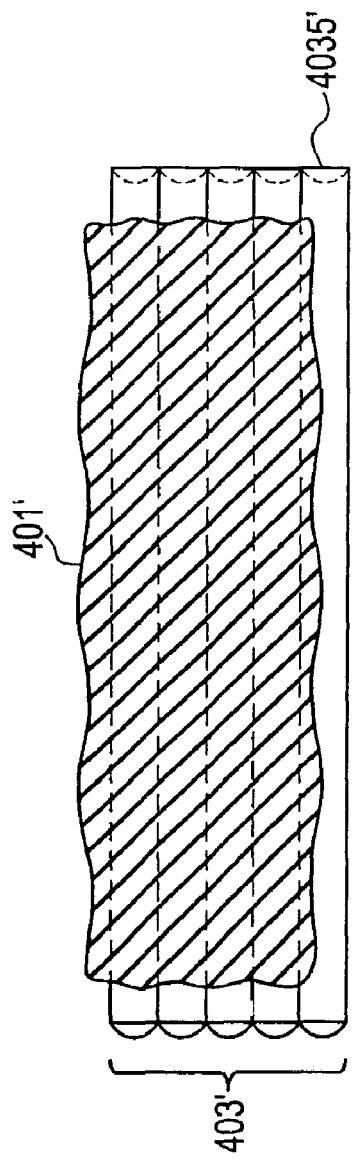
FIG. 4A PRIOR ART
FIG. 4B PRIOR ART

LASER IRRADIATION APPARATUS

DETAILED DESCRIPTION OF THE INVENTION

1. Technical Field to which the Invention Belongs

The present invention relates to a technique capable of irradiating a large area with a laser beam having high uniformity, and also the invention relates to an application method thereof.

2. Prior Art

In recent years, extensive studies have been made on techniques in which laser annealing is performed on a non-single crystal semiconductor film (an amorphous semiconductor film which is not a single crystal, or a semiconductor film having crystallinity such as a polycrystalline and microcrystalline, and a semiconductor film in which these crystallinities are mixed) formed on an insulating substrate such as glass, to crystallize the film or to improve its crystallinity. A silicon film is often used for the above semiconductor film.

As compared with a quartz substrate that has been conventionally frequently used, the glass substrate has such advantages that it is inexpensive, it is superior in workability, and a large substrate can be easily formed. This is the reason why the above-mentioned researches are carried out. Further, the reason why a laser is preferably used for crystallization resides in that the melting point of the glass substrate is low. The laser is capable of giving high energy to only the semiconductor film without varying the temperature of the substrate very much.

Since a crystalline silicon film formed by performing a laser annealing to a silicon film has high mobility, it is used in such a manner that thin film transistors (TFTs) are formed with this crystalline silicon film, and are employed for, for example, a monolithic liquid crystal electrooptical device in which a TFT for driving pixels and a TFT for driver circuits are formed on one glass substrate. Since the crystalline silicon film is made of a large number of crystal grains, it is also called a polycrystal silicon film or a polycrystal semiconductor film.

A method in which a pulse laser beam of an excimer laser or the like having high output is processed by an optical system so that a square spot of several cm or a linear shape of several hundred μm×several tens cm is formed on a surface to be irradiated, and the laser beam is made to scan (irradiation position of the laser beam is relatively moved to the irradiated surface) to make laser annealing, is superior in mass productivity and excellent in industry, so that the method is used by preference.

Particularly, when a linear laser beam is used, differently from the case of using a spot-like laser beam which requires back-and-forth and right-and-left scanning, laser irradiation to the whole irradiated surface can be made by scanning in only the direction normal to the line direction of the linear laser. Thus, high mass productivity can be obtained. The reason why scanning is made in the direction normal to the line direction is that it is the most effective scanning direction. By this high mass productivity, at present, laser annealing using the linear laser beam has become the mainstream.

Problem to be Solved by the Invention

When laser annealing is performed to the non-crystal semiconductor film by scanning of the laser beam that has been processed into a linear shape, rectangular, or square, some problems have occurred. One of especially serious problems among them is that the processing of laser beam is not uniformly carried out. When such a linear laser beam is used, laser annealing is nonuniformly performed onto the whole surface of the substrate.

FIG. 1 is a photograph of an optical microscope showing a state that a laser beam that has been processed into a linear shape by using a conventional optical system, is irradiated by one shot onto an amorphous silicon film. It can be observed irradiation marks at the center of the photograph.

FIG. 1 shows a case that an XeCl excimer laser having a wavelength of 308 nm is processed into a linear laser beam extending in the right-and-left direction on the paper surface, and is irradiated by one shot onto the amorphous silicon film.

It can be confirmed from FIG. 1 that edges in the width direction of the linear laser beam, particularly, an edge on the lower side of the paper surface has indentation, thereby being a linear laser beam having an uneven energy distribution.

FIG. 2a is a view schematically showing a state where a laser beam 201 having the uneven energy distribution shown in FIG. 1 is irradiated on a film 209.

As shown in FIG. 2a, a region 202 having a high energy density is formed at a center of the width direction, and regions 203 having a lower energy density compared to the region 202 are formed at peripheral portions of the width direction. FIGS. 2b and 2c each show sectional shapes of the energy distribution taken along the line X-X' and Y-Y' of FIG. 2a.

From FIGS. 2a to 2c, it can been seen that a laser beam 201 has different sectional shapes of the energy distribution in the width direction.

Laser annealing is performed onto the film by using the laser beam 201 of FIG. 2a, however, uniform laser annealing of the film can not be carried out.

The invention disclosed in the present specification has an object thereof to uniform the energy distribution in one direction of the laser beam, thereby uniformly performing the laser annealing of the film. Throughout the specification, "laser beam" indicates a region of 5% or more of the maximum energy within the laser beam.

Process Lead to the Invention

In general, in the case where a laser beam is processed into a linear shape, an originally substantially rectangular beam is made to pass through a suitable optical system and is processed into the linear shape. Although the aspect ratio of the substantially rectangular beam is about 2 to 5, for example, by an optical system shown in FIG. 3, it is transformed into the linear beam having an aspect ratio of 100 or more. At that time, the optical system is designed such that the distribution of energy in the beam is also homogenized at the same time.

The apparatus shown in FIG. 3 has a function to irradiate a laser beam, as a linear beam, from a laser beam generating unit 301 (in this state, the shape of the beam is substantially rectangular) through optical systems represented by 302, 303, 304, 306, and 308. Note that reference numeral 305 denotes a slit, and 307 denotes a mirror.

Reference numeral 302 denotes an optical lens serving to divide a laser beam in one direction, a linear direction in this case, and a cylindrical lens group (also referred to as a multicylindrical lens) is used. The divided many beams are overlapped and homogenized with respect to the linear direction by the cylindrical lens 306.

This structure is required to improve the strength distribution in the laser beam. The cylindrical lens group 303 also divides the laser beam in another direction, the width direction in this case, like the foregoing cylindrical lens group 302, and the divided beams are overlapped and homogenized with respect to the width direction by the cylindrical lenses 304 and 308.

That is, the combination of the cylindrical lens group 302 and the cylindrical lens 306 has a function to improve the strength distribution in the line direction of the linear laser beam, and the combination of the cylindrical lens group 303 and the cylindrical lenses 304 and 308 has a function to improve the strength distribution in the width direction of the linear laser beam.

In this case, with respect to the width direction, two cylindrical lenses 304 and 308 are used to make finer in the width direction of the linear laser beam on the irradiated surface 309. According to the width of the linear laser beam, the number of optical systems for overlapping may be made one, or may be made three or more.

The optical system serving to homogenize the energy distribution in the laser beam is referred to as a beam homogenizer. The optical system shown in FIG. 3 is also one of beam homogenizers. After the substantially originally rectangular laser beam is divided by the cylindrical lens groups 302 and 303, the divided beams each are shaped and overlapped by the cylindrical lenses 306, 304 and 308 to homogenize the energy distribution thereof.

Theoretically speaking, if the energy distribution of the laser beam is made even using a cylindrical lens group that includes infinite numbers of cylindrical lenses, a uniform laser beam can be obtained no matter what sectional shape the entered laser beam has.

However, in an industrially applicable cylindrical lens group, several, several tens at most, cylindrical lenses are used in consideration of its precision, cost, etc. In the cylindrical lens group as such, a laser beam is processed into a laser beam having an irregular energy distribution due to a sectional shape of the entered laser beam and the condition of entrance.

The present inventors have found that this unevenness, which has conventionally been considered as not much a trouble, causes a lot of problems mentioned above when that laser is used in laser annealing on a film represented by a thin film transistor (TFT) where minute elements are formed on the same substrate in a large number.

FIGS. 4a and 4b shows an example of, in a beam homogenizer for processing a laser into a linear laser beam, a cylindrical lens group 403 for dividing a laser beam in the width direction and a laser beam 401 entered thereto.

As shown in FIGS. 4a and 4b, laser beams 401, 401' emitted from the beam generating unit 301 in FIG. 3 and entered into the optical system for dividing the laser beams have a substantially rectangular shape in its cross section.

Laser beams to be emitted from the beam generating unit 301 are ideally emitted with a perfect rectangular shape. However, it is realistically impossible with technologies present, and the sectional shapes thereof become substantially rectangular shapes.

In FIG. 4a, the laser beam is not entered over the entire width of the cylindrical lens in a cylindrical lens 4031 on the top and a cylindrical lens 4036 on the bottom. In addition, the entered beam shape is irregular.

On the other hand, the laser beam is entered over the entire width of each lens in four cylindrical lenses 4032 to 4035 placed therebetween.

FIG. 5 is a structural diagram showing an optical system for processing with respect to its width direction, taken out from the optical system for processing linear laser beams. As shown in FIG. 5, when a laser beam 501 is to be entered into a cylindrical lens group 503 in a manner shown in FIG. 4A, the laser beam enters to cylindrical lenses 5031 and 5036 with its edge irregular, not straight.

For that reason, the laser beams divided by the cylindrical lenses 5031 and 5036 are overlapped with each other on an irradiated surface 509 while the laser beams maintain the irregular shape by cylindrical lens 504. Thus formed is a linear beam that is not homogenous in the linear direction, namely a beam having an energy distribution whose sectional shape in the width direction varies in accordance with linear direction.

Then it becomes, for example, a linear laser beam in which a region 202 having a high energy density as shown in FIG. 2a is formed near the center in the width direction, and regions 203 having a lower energy density as compared to the region 202 are formed on the periphery in the width direction.

When the laser beam 401' is to be entered to a cylindrical lens group 403' for dividing the laser beam in the width direction as shown in FIG. 4b, a laser beam having an irregular shape enters to a cylindrical lens 4035,' resulting in, similarly, a linear laser beam that is not homogenous in linear direction.

From the facts above, the present inventors have found out the followings. The cause of non-uniform laser annealing by a laser beam lies in an irregularly shaped laser beam that enters to some cylindrical lenses of a cylindrical lens group for dividing the laser beam. Because of this, the energy distribution of the linear laser beam becomes irregular.

Means for Solving the Problem

According to one aspect of the present invention, there is provided a laser irradiation apparatus comprising: a lens for dividing a laser beam in one direction; and an optical system for overlapping the divided laser beams, characterized in that a shape of a laser beam entering into the lens has edges vertical to the direction.

Further, according to another aspect of the present invention, there is provided a laser irradiation apparatus comprising: a beam generating unit; a lens for dividing a laser beam in one direction; and an optical system for overlapping the divided laser beams, characterized in that a slit is formed between the beam generating unit and the lens, for forming edges in the laser beam, which is vertical to the direction.

Still further, according to another aspect of the present invention, there is provided a laser irradiation apparatus comprising: an optical system for dividing a laser beam in one direction; and an optical system for overlapping the divided laser beams, characterized in that, in the direction, a width of the optical system for dividing is narrower than the maximum width of the laser beam before being divided.

Yet further, according to another aspect of the present invention, there is provided a laser irradiation apparatus comprising: a cylindrical lens group for dividing a laser beam in one direction; and an optical system for overlapping the divided laser beams, characterized in that a portion of the cylindrical lens of the cylindrical lens group is shielded.

EMBODIMENT MODE OF THE INVENTION

One embodiment mode of the present invention will be described with reference to FIG. 6. FIG. 6 shows, for simplification, only a homogenizer relative to the width direction in an apparatus for processing a linear laser beam.

Besides, in the following descriptions, a laser beam with substantially rectangular shape in its cross section at an emission is exemplified. However, the feature of the present invention resides in the sectional shape of the laser beam to be processed. Accordingly, any kind of laser beam with any sectional shape at the emission may be applicable. However, in order to efficiently use the energy of the laser beam, a laser beam with a rectangular shape is preferred to a circular or an elliptical one.

The periphery of a substantially rectangular laser beam 601 is cut with the use of a slit 610, forming a rectangular laser beam. With the slit 610, the formerly irregular edge of the laser beam is processed so as to be a straight line. In addition, the slit 610 is arranged so that the straight line is vertical to the direction along which the beam is divided by a cylindrical lens group 603 (width direction).

Then, the laser beam enters to an optical system for dividing this rectangular laser beam, here, the cylindrical lens group 603. For the slit 610, glass, quartz ground glass, ceramic, metal, etc. may be used, and particularly preferred is light-shielding with the quartz ground glass. This is because quartz is not decomposed by the laser beam, and hardly produces substances harmful to semiconductor manufacture.

The laser beam usable in the present invention is not limited to excimer laser beams such as KrF, XeCl, ArF and KrCl, but Ar laser, YAG laser, CO2 laser and other various laser beams may be used. The excimer laser includes a continuous light emission excimer laser as well as a pulse oscillation excimer laser.

At this point, the edge vertical to the direction along which the rectangular laser beam is divided, i.e., the longer sides of the rectangular in FIG. 6, are set in parallel with the boundaries between the cylindrical lenses of the cylindrical lens group. Also, the shorter sides of the rectangular are set in parallel with the boundaries between the cylindrical lenses of the cylindrical lens group for dividing the beam in the linear direction, though not shown.

The laser beam entered to the cylindrical lens group 603 is divided in one direction and divided beams are overlapped with each other on an irradiated surface 609 by a cylindrical lens 604. In this way, a laser beam homogenous in linear direction, although having the high energy density region 202 and the low energy density regions 203, can be obtained.

When the laser beam processed with the slit into a rectangular of which edge is straight enters to the cylindrical lens group, the longer sides of the rectangular are made coincident with the boundaries between the cylindrical lenses of the cylindrical lens group or with the ends of the cylindrical lens group for dividing in the width direction, and the shorter sides of the rectangular are made coincident with the boundaries between the cylindrical lenses of the cylindrical lens group or with the ends of the cylindrical lens group for dividing the beam in linear direction. By doing so, the high energy density region in the linear laser beam may be enlarged as compared to the case where the sides do not coincide with the boundaries or the ends.

Therefore, the laser beam may be processed to have a large area (to be longer if it is linear), improving productivity. Note that the high energy density region in this matter designates a region having an energy density equal to or larger than the energy density required for laser annealing.

Further, the energy distribution of the linear laser beam is almost homogenized in regions except for the beam ends. More uniform laser annealing is therefore possible.

On the other hand, as shown in FIG. 6, when at least one of edges vertical to the direction along which the laser beam is divided does not coincide with the boundaries between the cylindrical lenses of the cylindrical lens group or with the ends of the cylindrical lens group, upon entrance of the laser beam processed into a rectangular with the slit to the cylindrical lens group, a linear laser beam having a plurality of energy densities is obtained.

Another embodiment may be given in which the width in the direction along which an entered laser beam is divided is set wider than the width in the dividing direction of an optical system for dividing.

FIG. 7 shows an example thereof. In FIG. 7, a cylindrical lens group 703 includes, for instance, quartz ground glass as replacement for cylindrical lenses 7031, 7036 to which, if in the prior art, an irregularly shaped laser beam is entered. This shields light and makes wider the width of the laser beam in the direction along which the beam is divided than the width of an optical system for dividing (cylindrical lenses 7032 to 7035) in the dividing direction. A substantially rectangular laser beam 701 entered thus can have straight edges.

Though only a homogenizer relative to the width direction of the laser beam is shown in FIG. 7, for simplification, it is preferable to use a similarly structured optical system for dividing also with respect to the linear direction.

As a simpler method, the straight edge may be obtained by making wider the width of the entered laser beam 701 in the direction that the beam is divided than the width of the dividing optical system 703 itself in the dividing direction.

Then, the divided laser beams are overlapped on an irradiated surface 709 with the cylindrical lens 704. The laser beam thus processed can have an even energy distribution in the direction along which it is divided and, in addition, an enlarged region of high energy density.

In this way, the periphery of the substantially rectangular laser beam is cut to form the rectangular laser beam. However, the portion to be cut is preferably as small as possible in order to prevent energy loss of the laser beam.

It is also preferred to arrange the optical system so that as large portion of the high energy density region as possible, which is around the center of the laser beam, is entered to the optical system for dividing the laser beam.

The laser beam having a plurality of energy densities on the irradiated surface may have various shapes by controlling the condition of entrance to the cylindrical lens group for dividing the laser beam. For instance, the laser beam can have energy distribution of: a convex shape, as shown in FIG. 9a, consisting of three regions different in energy density from one another with the middle rectangular region the highest; a concave shape, as shown in FIG. 9b, consisting of three regions different in energy density from one another with the middle rectangular region the lowest; or a combined shape, as shown in FIG. 9c, consisting of two regions different in energy density from each other.

FIG. 8 shows an example of a laser irradiation apparatus using the present invention. A substantially rectangular laser beam irradiated from a beam generating unit 801 is processed into a linear shape, through reflecting mirrors 802, by optical systems 803, 808.

A reflecting mirror 807 reflects the direction of the laser beam toward a processed substrate 809. Although the reflecting mirror 807 is not always necessary, it is provided to make the laser irradiation apparatus compact. An example of an optical system in which no reflecting mirror 807 is provided is shown in FIG. 21, and an examples of an optical system in which a position is changed at which the reflecting mirror is brought in is shown in FIG. 22.

An irradiation stage 805 holding the processed substrate 809 can be moved relative to the width direction of the linear laser beam. In the laser irradiation apparatus shown in FIG. 8, such a structure is adopted that the irradiation stage is moved. However, such a structure may be adopted that the linear laser beam is moved.

However, when the linear laser beam is moved, the energy distribution is apt to change, so that there is a fear that the laser annealing becomes uneven. Thus, it is preferable that the irradiation stage is moved.

The optical system 803 includes an optical system processing the laser beam in the linear direction, and an optical system dividing the laser beam in the width direction. The optical system 808 serves to overlap the laser beams divided in the width direction on the same plane.

The role of the reflecting mirror 802 will be described below. The direction of the laser beam emitted from a beam generating unit 801 is changed subtly each time when the maintenance of the laser irradiation apparatus is conducted. Therefore, it is difficult to make the laser beam directly incident on the lens provided to the optical system 803, as the light beam vertical and parallel to the lens.

Therefore, a reflecting mirror 802 is arranged at an emitting port of the laser generating unit and an angle of the reflecting mirror 802 is adjusted, so that the direction of the laser beam may be finely adjusted. As a result, the laser beam can be made incident on the optical system 803 while substantially parallel thereto.

In the above, the beam homogenizer for processing the laser beam into the linear laser beam, and the laser irradiation apparatus using such the beam homogenizer have been explained.

Moreover, the foregoing beam homogenizer can also be applied to not only the case of processing the laser beam into a linear shape, but also the case of processing the laser beam into a rectangular or square shape with an aspect ratio of 100 or less.

In such the laser irradiation apparatus, as shown in FIG. 6, a slit 610 is arranged between the optical system for dividing the laser beam and the beam generating unit, and the periphery of the laser beam with a substantially rectangular shape is cut to form a rectangular laser beam with edges of straight lines.

In addition, the laser beam may be processed into square other than processing into rectangular by cutting all the peripheries of the laser beam with the slit 610. It is also possible to cut only a part of the periphery by means of the slit. At that occasion, as described later, at least an incident of the laser beam having an irregular shape on the optical system for dividing the laser beam in the width direction is required to be eliminated.

Further, as means for eliminating the incident of the laser beam having irregular shape on the optical system for dividing the laser beam, there can be employed a method in which in place of the slit 610, the width in the direction along which an entered laser beam is divided is set wider than the width in the dividing direction of an optical system for dividing. As an example thereof, as shown in FIG. 7, there is a method in which a part of cylindrical lenses in the cylindrical lens group is shielded from light.

In this method, it is preferably applied to both cylindrical lens groups for dividing the laser beam in the width direction and for dividing in the linear direction. However, in the case where the linear laser beam is formed, the shielding is required to be applied at least to the cylindrical lens group for dividing the laser beam in the width direction.

In the linear laser beam, at least the laser beam with an irregular shape must be eliminated from entering into the optical system for dividing the laser beam in the width direction. The reason thereof resides in that when the laser annealing is performed, in the case of the linear laser beam, the irradiated substrate is relatively moved to the direction vertical to the linear direction, that is, to the width direction. Accordingly, the variation of energy distribution in the width direction results in nonuniform laser annealing over all the surface of the substrate.

On the other hand, the incident of the irregular beam on the optical system for dividing the laser beam in the linear direction hardly influences on the energy distribution at the center portion of the linear laser beam. Accordingly, if the center portion only is used, industrial application thereof is available.

In the case where scanning is performed on the irradiated surface by using a laser beam having a rectangular shape or a square shape, if the length of one side of the laser beam having a rectangular shape or a square shape (the length of the longer side in case of rectangular) is longer than the length of the short side of the substrate, similarly to the linear laser beam, laser annealing is completed by scanning in only one direction.

However, in the case where the length of the rectangular or square laser beam in the long side direction is shorter than the length of the short side of the substrate, it is necessary to make scanning of the rectangular or square laser beam at plural times, with the result that a mechanism for moving the irradiation stage becomes complicate.

The irradiated substrate is not limited to a glass substrate, but a quartz substrate, a ceramic substrate, a semiconductor substrate, a plastic substrate, an organic resin substrate, or the like may be employed. Particularly, it is effective to use the laser annealing against the glass substrate, the plastic substrate, or the organic resin substrate.

An example of the use of the laser beam to which the present invention is applied, resides in the crystallization of films having a crystal structure such as amorphous, polycrystal, and microcrystal, or in the improvement of the crystallinity of the film. The "improvement of the crystallinity" means the fact that the crystal structure of the film observed by Raman spectroscopy analysis etc. further approaches to single crystal. However, the present inventor found, separately from the result obtained by Raman spectroscopy analysis, that the electric field mobility of a film is increased by laser annealing. Accordingly, the definition of the "improvement of crystallinity" includes the increase in this electric field mobility.

In addition, the laser beam to which the present invention is applied, can be used for activating impurities that have been added to the films, or for the laser annealing for recovering the disorder in the crystal structure due to ion injection, and the like.

Premising such uses, the present invention is particularly effective for a film containing silicon as a main component. However, it is needless to say that the film to be irradiated in the present invention is not limited to a particular film.

When YAG laser is used for the purpose of crystallizing a film containing silicon as a main component, a wave length having at least one of the second to the fourth harmonic waves is used. Further, when YAG laser is used for the purpose of activating or/and laser annealing, a wave length containing one or a plurality of the basic wave to the fourth harmonic waves is used.

Shown in the following embodiments is an example of the present invention, and the present invention is not particularly limit to the embodiments. For example, a semi-cylindrical lens group is used for the optical system for dividing the laser beam, to thereby reduce an influence of a spherical aberration. As a result, the present invention can be used for processing a laser beam so as to have a vertical sectional shape at the ends of the energy distribution on the irradiated surface.

EMBODIMENT

Embodiment 1

FIG. 10 is a photograph of an optical microscopy showing a state where a laser beam processed into a linear shape is irradiated onto an amorphous silicon film by one shot using a laser irradiation apparatus of FIG. 8. It can be observed marks of the laser beam irradiation at the center of the photograph.

FIG. 10 is a case where an XeCl excimer laser having a wave length of 308 nm is processed into a linear laser beam having a width of 500 μm extending in right-and-left direction of a paper surface, and this laser beam is irradiated on the amorphous silicon film.

A linear beam used in FIG. 10 has been processed by using an optical system in which a part of quartz cylindrical lens of the cylindrical lens group of the optical system used for dividing the laser beam in the width and linear directions is replaced with quartz ground glass. With this, entrance of a laser beam having an irregular shape into the optical system for dividing the laser beam has been prevented.

It can be confirmed, from FIG. 10, that by cutting the periphery of the laser beam having a substantially rectangular shape, energy distribution in the linear direction of the linear laser beam becomes uniform.

FIG. 11 is a view schematically showing FIG. 10. As shown in FIG. 11, edges, formed by a linear laser beam 1101, between a high energy density region 1102 and low energy density regions 1103 are straight lines. This shows the sectional shapes of the energy distributions in the width direction are equal in any portion. Note that in the present embodiment, the reason why the regions 1103 are produced, causes the precision of machining the lens or the precision of positioning the lens.

However, compared to that of FIG. 1 and FIG. 2, the high energy density region 1102 becomes extremely wider, thereby being capable of uniformly laser annealing.

Embodiment 2

The present embodiment is an example in which laser annealing is used upon manufacturing a polycrystal silicon film. First, a method of manufacturing a film to be irradiated with laser will be described. The films to be irradiated with laser are the following three kinds of films in the present specification. The present invention is effective for any film.

In any of three kinds of the films, first, a Corning 1737 glass substrate of 127 mm square is used as a substrate, and a silicon nitride film with a thickness of 200 nm or more is formed thereon as an under film for preventing the diffusion of impurities from the substrate, by a plasma CVD method in which silane and ammonia are used as the starting gases.

Heat treatment is then subjected thereto to improve the film quality.

Further, the second under film and an amorphous silicon film are continuously formed (subsequent film formation is carried out after the former film formation without exposing to air) by the plasma CVD method. As the second film, a silicon oxide film (SiOx), silicon nitride film (SiNx) or silicon nitride oxide film (SiOxNy) is formed to have a thickness of 10 to 100 nm. In this embodiment, 50 nm of silicon oxide film is formed. An amorphous silicon film is formed to have a thickness of 10 to 100 nm. In this embodiment, 50 nm of the amorphous silicon film is formed thereon by a plasma CVD method. This amorphous film will be hereinafter referred to as a starting film.

(Manufacturing Procedure of Film A)

The starting film is subjected to heat bathing at 450° C. for one hour. This step is for reducing the hydrogen concentration in the amorphous silicon film. If hydrogen in the film is excessively high, the film can not resist the laser energy, so that this step is required.

The density of hydrogen in the film is suitably the order of $10^{20}$ atoms/cm$^3$. This dehydrogenized amorphous silicon film will be referred to as a non-single crystal silicon film A.

(Manufacturing Procedure of Film B)

A nickel acetate solution of 10 ppm is applied to the starting film by a spin coating method to form a nickel acetate layer. It is more preferable to add a surfactant to the nickel acetate solution. Since the nickel acetate layer is very thin, although it is not always film-like, a problem does not occur in the subsequent steps.

Next, the substrate on which each film is laminated in the manner described above is subjected to thermal annealing at 600° C. for 4 hours. Then, the amorphous silicon film is crystallized, so that a crystalline silicon film B of a non-single crystal silicon film is formed.

At this time, nickel as a catalytic element functions as nuclei of crystal growth, so that crystallization is accelerated. By the function of nickel, crystallization can be made at a low temperature for a short time such as 600° C. and 4 hours. The details are disclosed in Japanese Patent Application Laid-open No. Hei. 6-244104.

It is preferable that the concentration of the catalytic element is $1\times10^{15}$ to $1\times10^{19}$ atoms/cm$^3$. When the concentration is as high as $10^{19}$ atoms/cm$^3$ or more, metallic properties appear in the crystalline silicon film, and the semiconductor characteristics are lost. In the present embodiment, the concentration of the catalytic element in the crystalline silicon film is $1\times10^{17}$ to $10^{18}$ atoms/cm$^3$. These values are obtained by analysis and measurement with secondary ion mass spectroscopy (SIMS).

(Manufacturing Procedure of Film C)

A silicon oxide film with a thickness of 700 nm is further formed on the starting film. A plasma CVD method is used as a film formation method.

Next, a part of the silicon oxide film is completely opened by a photolitho patterning step.

Further, for the purpose of forming a thin oxide film on the opening portion, irradiation of UV light is carried out in an oxygen atmosphere for 5 minutes. This thin oxide film is formed to improve wettability of the opening portion to a subsequently introduced nickel solution.

Next, a nickel acetate solution of 100 ppm is applied to the film by a spin coating method, so that nickel acetate enters the opening portion. It is more preferable to add a surfactant into the nickel acetate solution.

Next, thermal annealing at 600° C. for 8 hours is carried out, so that crystal grows from the nickel introduced portion in the lateral direction. At this time, the role of nickel is the same as in the film B. In the condition at this time, about 40 µm as a lateral growth amount is obtained.

In this way, the amorphous silicon film is crystallized, so that a crystalline silicon film C of a non-single crystal silicon film is formed. Thereafter, the silicon oxide film on the non-single crystal silicon film C is peeled and removed by using buffered hydrofluoric acid.

Laser annealing using an excimer laser is applied to the non-single crystal silicon films A, B, and C obtained in this way.

FIG. 8 shows a laser irradiation apparatus in the present embodiment. FIG. 8 shows the outline of the laser irradiation apparatus.

In FIG. 8, a laser beam is radiated from a laser beam generating unit 801, and after the traveling direction of the laser beam is adjusted by reflecting mirrors 802, the beam is processed by optical systems 803 and 808 so that its sectional shape is made linear. A reflecting mirror 807 reflects the laser beam, so that a processed substrate 809 is irradiated with the laser beam. A beam expander which suppresses an expanding angle of the laser beam and can adjust the size of the beam may be inserted between the reflecting mirrors 802.

Then, an irradiation stage 805 holding the processed substrate 809 can be moved in the width direction of the linear laser beam.

In the optical system 803 according to the present embodiment, the slit 610 is provided, as shown in FIG. 6, at immediately before the optical system for dividing the laser beam between the optical system for dividing the laser beam and the beam generating unit, to cut the periphery of the entered laser beam so as to form a rectangular shape.

By using such apparatuses, processing of the laser beam as described below was carried out.

As the laser beam generating unit 801, the unit for oscillating XeCl excimer laser (wavelength 308 nm) is used. Other than this, excimer laser such as KrF excimer laser (wavelength 248 nm), ArF (wavelength 193 nm), KrCl (wavelength 222 nm), and the like may be used. Also, Ar laser, YAG laser having at least one of the second to the fourth harmonic waves, etc. may be used.

The size of the laser beam emitted from the beam generating unit is about 15 mm×45 mm at immediately before the optical system for dividing the laser beam.

The size of the slit arranged at immediately before the optical system for dividing the laser beam is 12 mm×35 mm. As a result, the periphery of the laser beam is cut to form a rectangular shape.

Then, edges vertical to the direction along which the laser beam is divided are made parallel with the boundaries between the cylindrical lenses of the cylindrical lens group for dividing the laser beam.

As the cylindrical lens group for dividing the laser beam in the linear direction, a cylindrical lens group in which seven cylindrical lenses each made of synthesis quartz with a width of 5 mm are arranged in parallel to each other is used.

As the cylindrical lens group for dividing the laser beam in the width direction, a cylindrical lens group in which six cylindrical lenses each made of synthesis quartz with a width of 2 mm are arranged in parallel to each other is used.

The cylindrical lens group is arranged so that the center thereof is aligned with the center of a laser beam.

The laser beams thus divided pass through the optical lens for overlapping the laser beams, and are processed into a width of 0.1 to 1 mm and a length of 100 to 300 mm on the processed substrate 809. In the present embodiment, a linear laser beam with a width of 0.4 mm and a length of 135 mm is obtained.

Here, the shorter sides of the rectangular are made coincident with the ends of the cylindrical lens group in the linear direction. Also, the longer sides of the rectangular laser beam are made coincident with the ends of the cylindrical lens group in the width direction. By doing so, the laser beam can be obtained in which the sectional shape of the energy distribution of the laser beam on the irradiated surface is rectangular.

Next, an apparatus shown in FIG. 12 will be described. A cassette 1203 in which a number of, for example, 20 processed substrates 809 are contained is disposed in a load/unload chamber 1205. One substrate is transferred from the cassette 1203 by a robot arm 1204 into an alignment chamber 1202.

In the alignment chamber 1202, an alignment mechanism for correcting the positional relation between the processed substrate 809 and the robot arm 1204 is disposed.

The substrate is transferred into a substrate transfer chamber 1201 by the robot arm 1204, and further, transferred into a laser irradiation chamber 1206 by the robot arm 1204.

In FIG. 8, the linear laser beam radiated onto the processed substrate 809 has 0.4 mm in width×135 mm in length.

The energy density of the laser beam at the irradiated surface is in the range of 100 mJ/cm$^2$ to 500 mJ/cm$^2$, for example, 350 mJ/cm$^2$ in the present embodiment. The irradiation stage 805 is moved in one direction at 1.2 mm/s so that the linear laser beam is made to scan.

The oscillation frequency of the laser is 30 Hz, and when an attention is paid to one point of the irradiated object, 10 shots of the laser beams are applied. The number of shots is suitably selected in the range from 5 shots to 50 shots.

After the end of the laser irradiation, the processed substrate 809 is returned to the substrate transfer chamber 1201 by the robot arm 1204.

The processed substrate 809 is transferred to the load/unload chamber 1205 by the robot arm 1204 and is stored in the cassette 1203.

With this, the laser annealing step is ended. In this way, the foregoing step is repeated, so that a number of substrates can be continuously processed one by one.

In the laser irradiation system in FIG. 12, in order to minimize the space of the apparatus, a load/unload chamber 1205 is served by one chamber. However, to increase productivity, it may take a structure in which unload chamber is provided separately.

In that case, such a structure may be employed for the improvement of the productivity in which a second alignment chamber is provided to a substrate transferring chamber 1201 and the unload chamber connected to the second alignment chamber is provided. However, if such a structure is employed in which the second substrate transferring chamber is arranged at a laser irradiation chamber 1206, and the processed substrates after the completion of the laser irradiation are transferred to the second alignment chamber and the unload chamber with a robot arm of the second substrate transferring chamber, further effect on the productivity may be obtained.

In the present embodiment, although the linear laser beam is used, even if any beam shape from the linear shape to the square is used, the effect of the feature of the present invention is obtained.

As the result that the non-single crystal films A, B, and C were subjected to laser annealing by using this laser irradiation apparatus, in the non-single crystal silicon film A, it was possible to obtain a uniform laser crystallized polycrystal silicon film over the whole surface of the substrate.

In the non-single crystal silicon films B and C, the crystallinity of the silicon film over the whole surface of the substrate was further promoted, so that it was possible to obtain a polycrystal silicon film having a high electric field effect mobility compared to that before laser annealing.

When the polycrystal silicon film obtained in accordance with the present embodiment is utilized as semiconductor layers including a source, a drain, and a channel region of TFT that functions as a switching element of a liquid crystal display or an organic EL display, it can be obtained the one in which the mark caused by the laser processing is not noticeable compared with the prior art.

Embodiment 3

In the present embodiment, as a method for cutting the periphery of a laser beam having a substantially rectangular shape, a cylindrical lens of a cylindrical lens group of an optical system for dividing the laser beam is shielded from light to which a laser beam having an irregular shape is entered.

When employing the method shown in Embodiment 2, the shorter sides and the longer sides of the rectangular slit need to be arranged in parallel with the respective dividing directions. There is a fear that misalignment in the arrangement causes entrance of an irregularly shaped laser beam into the optical system for dividing. This embodiment, however, can solve the problem above, as the cylindrical lenses in the optical system for dividing to which an irregularly shaped laser beam enters are shielded against light.

This embodiment uses a laser irradiation apparatus having the structure obtained by removing the slit 601 from the laser irradiation apparatus in Embodiment 2 and by shielding some cylindrical lenses of the cylindrical lens group being shielded against light.

The size of the laser beam emitted from a beam generating unit immediately before the optical system is about 15 mm×45 mm.

As the cylindrical lens group for dividing the laser beam in the width direction, a cylindrical lens group in which eight cylindrical lenses each made of synthesis quartz with a width of 2 mm are arranged in parallel to each other is used. The cylindrical lens group is arranged so that the center thereof is aligned with the center of an entered laser beam, and both ends of the cylindrical lenses are shielded by quartz ground glass. As a result, periphery in the width direction of the entered laser beam can be cut.

As the cylindrical lens group for dividing the laser beam in the line direction, a cylindrical lens group in which nine cylindrical lenses each made of synthesis quartz with a width of 6 mm are arranged in parallel to each other is used. The cylindrical lens group is arranged so that the center thereof is aligned with the center of an entered laser beam, and both ends of the cylindrical lenses are shielded by quartz ground glass. As a result, periphery in the line direction of the entered laser beam can be cut.

In this way, in the present embodiment, the width of the optical system for dividing the laser beam is made shorter than the width of the laser beam with respect to its dividing direction. As a result, periphery of the laser beam can be cut.

The cylindrical, lenses on both ends of the cylindrical lens group are shielded against light in this embodiment. Alternatively, a cylindrical lens group whose width is shorter than the width of a laser beam to be entered with respect to the dividing direction may be used. In that case, a light-shielding plate is preferably placed around the cylindrical lens group in order to cut a part of the laser beam which is not entered. Also, the cylindrical lens group may be supported by the light-shielding plate.

The laser beam thus divided is, after passing through the optical system for overlapping, processed to have a width of 400 µm and a length of 13.5 cm on a processed substrate.

As the result that the non-single crystal films A, B, and C were subjected to laser annealing by using this laser irradiation apparatus, in the non-single crystal silicon film A, it was possible to obtain a uniform laser crystallized polycrystal silicon film over the whole surface of the substrate.

Also, in the non-single crystal silicon films B and C, the crystallinity of the silicon film over the whole surface of the substrate was further promoted, so that it was possible to obtain a polycrystal silicon film having a high mobility compared to that before laser annealing.

When the polycrystal silicon film obtained in accordance with the present embodiment is utilized as semiconductor layers including a source, a drain, and a channel region of TFT that functions as a switching element of a liquid crystal display or an organic EL display, it can be obtained the one in which the mark caused by the laser processing is not noticeable compared with the prior art.

Embodiment 4

In the present embodiment, a laser beam is divided by using a cylindrical lens group shorter than the width of the laser beam, and a cylindrical lens to which the laser beam having an irregular shape is entered, is eliminated.

Besides, the laser irradiation apparatus of this embodiment adopts the structure in which a combination cylindrical lens group is used for the optical system of the beam homogenizer in the width direction to reduce the aberration of the lens. Adoption of such a structure makes it possible to reduce a blur region to 25 µm or less in the energy distribution in the width direction on the surface to be irradiated with a linear laser beam, and to bring the edge thereof to nearly vertical. The blur region refers to a region of which energy is 90 to 5% of the maximum.

FIG. 8 shows a laser irradiation apparatus according to the present embodiment. FIG. 8 is an outer appearance of the laser irradiation apparatus.

In the laser irradiation apparatus in FIG. 8, a laser beam is emitted from a laser beam generating unit 801 and, after adjustment is made on its traveling direction by reflecting mirrors 802, processed to have a linear sectional shape by optical systems 803, 808. A reflecting mirror 807 reflects a pulse laser beam to irradiate a processed substrate 809 with the laser beam. A beam expander that can keep the angle of the laser beam from being wide and can adjust the size of the beam may be inserted between the reflecting mirrors 802.

An irradiation stage 805 holding the processed substrate can move in the width direction of the linear laser beam.

The optical system 803, the reflecting mirror 807, and the cylindrical lens 808 in accordance with the present embodiment have the structures shown in FIG. 13.

In FIG. 13, the incident laser beam is divided in the linear direction by a cylindrical lens group 1402, and is divided in the width direction by a combination cylindrical lens group 1403 of convex meniscus cylindrical lens and a planoconvex cylindrical lens.

In the present embodiment, although the structure shown in FIG. 13 is used as the optical lens for dividing the laser beam in the width direction. However, such a structure may be employed that another combination cylindrical lens group, or a cylindrical lens group in which almost all aberration is eliminated by processing lenses into aspheric lenses may be used, for reducing the blur region and making the edges with a nearly vertical shape.

Then the laser beams divided by an optical lens 1404 made of a triplet type symmetrical lens are overlapped and homogenized, and the laser beams are overlapped on the processed substrate 1409 relative to the width direction through a slit 1405 and a cylindrical lens 1406 and by an optical lens 1408 made of a Tessar type symmetrical lens.

In the present embodiment, although the symmetrical lens is used as the optical lenses 1404 and 1408, another combination lens may be used, or such a structure that aberration is almost eliminated by making an aspheric lens may be adopted.

Beside, the slit 1405 is not necessarily required, and is used for adjusting the width of the linear laser beam.

With the above-mentioned apparatus, the processing of the laser beam described below is carried out.

As the laser beam generating unit 801, in this case, the unit oscillating XeCl excimer laser (wave length 308 nm) is used. Alternately, KrF excimer laser (wave length 248 nm), ArF (wave length 193 nm), KrCl (wave length 222 nm), etc. may be used.

The length in the width direction of the laser beam emitted from the laser irradiation apparatus was about 16 mm. The laser beam is made incident on the optical lens for dividing the laser beam in the width direction.

As the optical lens, such a structure 1403 is employed that a cylindrical lens group in which seven cylindrical lenses each made of synthesis quartz with a width of 2 mm are arranged in parallel to each other and a cylindrical lens group in which seven cylindrical lenses having a convex-convex plane each made of synthesis quartz with a width of 2 mm are arranged, are combined. In FIG. 13, only 4 stages of the cylindrical lens group are described for simplification.

As described above, the optical lens has a width of only 14 mm which is smaller than 16 mm of the width of the entered laser beam. Accordingly, the ends of the entered laser beam are not used.

Since the ends of the entered laser beam have nonuniform energy, in order to enhance the uniformity of the laser beam, it is preferable not to use ends of the laser beam.

The laser beam thus divided in the width direction is processed to have a width of 300 to 1,000 μm on the substrate through an optical lens 1404 and an optical lens 1408. The width of the laser beam can be adjusted by varying the distance between the optical lenses 1404 and 1408.

The linear laser beam thus processed hardly receives the influence of the aberration of the lens with respect to the width direction. Accordingly, the linear laser beam having vertical edges of the energy distribution may be obtained.

In the present embodiment, the linear laser beam irradiated on the processed substrate 809 has a width of 0.4 mm×a length of 135 mm.

Energy density of the laser beam on the irradiated surface ranges from 100 mJ/cm$^2$ to 500 mJ/cm$^2$. In this embodiment, it was set to 350 mJ/cm$^2$. While moving an irradiation stage 805 in one direction at 1.2 mm/s, the linear laser beam is scanned.

The oscillation frequency of the laser is set to 30 Hz. An attention is given to one point of the object to be irradiated, 10 shots of laser beam irradiation are performed thereon.

The number of shot may be appropriately selected from 5 shots to 50 shots.

Thus laser annealing process is ended. By repeating the above-mentioned process in this manner, a large number of substrates can be continuously processed one by one.

Though the present embodiment uses a linear laser, any beam shape from linear to square can be applied to the present invention to obtain the same effect that is a feature of the present invention.

As the result that the non-single crystal films A, B, and C were subjected to laser annealing by using this laser irradiation apparatus, in the non-single crystal silicon film A, it was possible to obtain a uniform laser crystallized polycrystal silicon film over the whole surface of the substrate.

Also, in the non-single crystal silicon films B and C, the crystallinity of the silicon film over the whole surface of the substrate was further promoted, so that it was possible to obtain a polycrystal silicon film having a high mobility compared to that before laser annealing.

In addition, employment of the combination lens as the optical lens can prevent the phenomenon of stripes where the characteristics of TFTs are periodically fluctuated. Comparing to the conventional optical systems for preventing the occurrence of stripes, the difference can be remarkably seen when an active matrix type liquid crystal display device or an organic EL display is manufactured in which the silicon film obtained in accordance with the present invention is used as the switching element.

In the present embodiment, although the symmetrical lenses are used as the optical lenses 1404 and 1408, another combination lens may be used, or such a structure that aberration is almost eliminated by making an aspheric lens may be adopted.

In the present embodiment, although the combination lenses are used for the optical lenses 1404 and 1408 to reduce aberration, even if only the optical lens 1408 is made the combination lens, and the optical lens 1404 is made a cylindrical lens single body, it is possible to relieve the stripe formation.

When a TFT having an active layer made of the laser annealed silicon film is manufactured, both of an N channel type and a P channel Type can be manufactured.

Further, the structure of combination of an N channel type and a P channel type can also be obtained. Besides, a number of TFTs can also be integrated to form an electronic circuit.

Although the non-single crystal silicon films A, B, and C are provided on the flat glass substrate, even if the formed surfaces of the non-single crystal silicon films A, B, and C have uneven shapes due to wiring or the like, the laser annealing is effective.

In the case where a liquid crystal display or an organic EL display including TFTs is manufactured by using the semiconductor film subjected to the laser annealing through the optical system of the present invention, a high quality display can be obtained in which fluctuation of characteristics of each TFT is low.

The above can also be applied to a semiconductor film subjected to laser annealing through optical systems indicated in other embodiments.

Embodiment 5

In the present embodiment, by using a laser beam processed into a square shape of 10 mm×10 mm, the non-single crystal silicon films A, B, and C are subjected to laser annealing.

An optical system for processing a beam into a square shape is shown in FIG. 14. In the present embodiment, it is preferable that the direction of the incident laser beam is vertical to the cylindrical lens group 1302 and semi-cylindrical lens group 1303.

The incident laser beam is divided in an X-axis direction by the cylindrical lens group 1302, and is divided in a Y-axis direction (the X-axis direction and the Y-axis direction correspond to the linear direction and the width direction in the linear laser beam) by the semi-cylindrical lens group 1303.

The divided laser beams are overlapped on the processed surface 1309 by a cylindrical lens 1306 with respect to the X-axis direction, and are overlapped on the processed surface 1309 with respect to the Y-axis direction by a cylindrical lens 1304.

Further, in a laser processing apparatus used in the present embodiment, an irradiation stage includes means for moving in two directions of the X-axis direction and the Y-axis direction.

By using the above optical system, the laser beam is processed into a square of 10 mm×10 mm at the processed substrate, and the non-single crystal silicon films A, B and C are subjected to laser annealing. The energy density of the laser beam at the irradiated surface is made to 350 mJ/cm2.

As a result, in the non-single crystal silicon film A, it was possible to obtain a polycrystal silicon film in which the whole surface of the substrate was almost uniformly laser crystallized.

Further, in the non-single crystal silicon films B and C, the crystallinity of the silicon films on the whole surface of the substrate was further promoted, and it was possible to obtain polycrystal silicon films having a high electric field effect mobility compared to that before laser annealing.

Embodiment 6

This embodiment of the present invention will be described with reference to FIGS. 15 to 18. Here, a description will be made on a method of manufacturing a pixel portion and a driver circuit provided on the periphery of the pixel portion of a liquid crystal display device at the same time using a semiconductor film obtained in Embodiments 1 to 3. However, for simplifying the description, with respect to the driver circuit, a CMOS circuit as a basic circuit of a shift register circuit, a buffer circuit, and the like, and an n-channel TFT forming a sampling circuit will be shown.

In FIG. 15(A), it is desirable to use a glass substrate or a quartz substrate as a substrate 3100. Other than those, a substrate obtained by forming an insulating film on the surface of a silicon substrate, a metal substrate, or a stainless substrate may be used. A plastic substrate may also be used so far as the heat resistance permits.

An under film 3101 made of an insulating film containing silicon (in this embodiment, this insulating film generically denotes a silicon oxide film, a silicon nitride film, or a silicon nitride oxide film) and having a thickness of 100 to 400 nm is formed by a plasma CVD method or a sputtering method on the surface of the substrate 3100 on which a TFT is to be formed. Note that the silicon nitride oxide film in this embodiment is an insulating film expressed by SiOxNy, and denotes an insulating film containing silicon, oxygen, and nitrogen at a predetermined ratio.

In this embodiment, the under film 3101 was formed of a two-layer structure of a silicon nitride oxide film with a thickness of 25 to 100 nm, here, 50 nm, and a silicon oxide film with a thickness of 50 to 300 nm, here, 150 nm. The under film 3101 is provided to prevent impurity contamination from the substrate, and in the case where the quartz substrate is used, the under film does not have to be always provided.

Next, a semiconductor film (in this embodiment, an amorphous silicon film (not shown)) containing amorphous structure and having a thickness of 20 to 100 nm is formed on the under film 3101 by a known film formation method. Note that the semiconductor film containing amorphous structure includes an amorphous semiconductor film and a microcrystalline semiconductor film, and also, a compound semiconductor film containing amorphous structure, such as an amorphous silicon germanium film.

Then, in accordance with a technique disclosed in Japanese Patent Application Laid-open No. Hei 7-130652 (corresponding to U.S. Pat. No. 5,643,826), a semiconductor film 3102 containing crystal structure (in this embodiment, a crystalline silicon film) is formed. The technique disclosed in the publication is crystallizing means using, when crystallizing an amorphous silicon film, a catalytic element (one kind or plural kinds of elements selected from nickel, cobalt, germanium, tin, lead, palladium, iron, and copper, representatively nickel) for promoting crystallization.

Specifically, the technique is such that a heat treatment is carried out in a state where a catalytic element is held on the surface of an amorphous silicon film, so that the amorphous silicon film is transformed into a crystalline silicon film. In this embodiment, although a technique disclosed in the embodiment 1 of the publication is used, a technique disclosed in the embodiment 2 may be used. Note that although the crystalline silicon film includes a so-called single crystal silicon film and a polycrystalline silicon film, the crystalline silicon film formed in this embodiment is a silicon film including crystal grain boundaries (FIG. 15(A)).

It is desirable to carry out the step of crystallization in such a manner that although depending on a hydrogen content, the amorphous silicon film is preferably heated at 400 to 550° C. for several hours to carry out a dehydrogenating treatment so that the hydrogen content is lowered to 5 atom % or less. The amorphous silicon film may be formed by another manufacturing method such as a sputtering method or an evaporation method, but it is desirable that impurity elements such as oxygen and nitrogen is sufficiently reduced.

Here, since the under film and the amorphous silicon film can be formed by the same film forming method, both may be sequentially formed. Then the under film is prevented from being exposed to the atmosphere once after the under film is formed, so that pollution on the surface can be prevented, and it is possible to reduce fluctuation in characteristics of TFTs to be manufactured.

Next, by a method described in the embodiments 1 to 3, laser annealing is applied to the crystalline silicon film 3102 to form a crystalline silicon film 3103 in which the crystallinity is improved. As laser light, although pulsed oscillation or continuous-wave excimer laser light is desirable, continuous-wave argon laser light may be used (FIG. 15(B)).

In this embodiment, by using the optical system shown in the embodiment 2, pulsed oscillation excimer laser light is converted into linear light and a laser annealing step is carried out. The laser annealing condition is such that a XeCl gas is used as an excitation gas, treatment temperature is adjusted to room temperature, the frequency of pulsed oscillation is set to 30 Hz, and the density of laser energy is set to 250 to 500 mJ/cm$^2$ (representatively 350 to 400 mJ/cm$^2$).

The laser annealing step carried out in the above condition has effects to completely crystallize an amorphous region remaining after thermal crystallization, and to reduce defects or the like of a crystalline region which is already crystallized. Thus, this step may be called a step of improving crystallinity of a semiconductor film by light annealing or a step of promoting crystallization of a semiconductor film. Such effects can also be obtained by optimizing the condition of laser annealing. In this embodiment, such a condition is called a first annealing condition.

Next, a protection film 3104 for subsequent impurity addition is formed on the crystalline silicon film 3103. A silicon nitride oxide film or a silicon oxide film with a thickness of 100 to 200 nm (preferably 130 to 170 nm) is used as the protection film 3104. This protection film 3104 has meanings to prevent the crystalline silicon film from being directly exposed to plasma at impurity addition, and to enable delicate concentration control.

Then a resist mask 3105 is formed thereon, and an impurity element for giving p type (hereinafter referred to as a p-type impurity element) is added through the protection film 3104. As the p-type impurity element, representatively an element belonging to group 13, typically boron or gallium may be used. This step (called a channel doping step) is a step for controlling a threshold voltage of a TFT. Here, boron is added by an ion doping method in which diborane ($B_2H_6$) is not subjected to mass separation but is subjected to plasma excitation. Of course, an ion implantation method using mass separation may be used.

By this step, an impurity region 3106 containing the p-type impurity element (in this embodiment, boron) with a concentration of $1\times10^{15}$ to $1\times10^{18}$ atoms/cm$^3$ (representatively $5\times10^{16}$ to $5\times10^{17}$ atoms/cm$^3$) is formed. In this embodiment, an impurity region containing a p-type impurity element within at least the above concentration range is defined as a p-type impurity region (b) (FIG. 15(C)).

Next, the resist mask 3105 is removed, and resist masks 3107 to 3110 are newly formed. Then an impurity element for giving n type (hereinafter referred to as an n-type impurity element) was added to form impurity regions 3111 to 3113 exhibiting an n type. As the n-type impurity element, representatively an element belonging to group 15, and typically phosphorus or arsenic may be used (FIG. 15(D)).

The low concentration impurity regions 3111 to 3113 are impurity regions which are subsequently made to function as LDD regions in n-channel TFTs of a CMOS circuit and a sampling circuit. In the impurity regions formed here, the n-type impurity element with a concentration of $2\times10^{16}$ to $5\times10^{19}$ atoms/cm$^3$ (representatively $5\times10^{17}$ to $5\times10^{18}$ atoms/cm$^3$) is contained. In this embodiment, an impurity region containing an n-type impurity element within the above concentration range is defined as an n-type impurity region (b).

Here, phosphorus with a concentration of $1\times10^{18}$ atoms/cm$^3$ is added by an ion doping method in which phosphine ($PH_3$) is not subjected to mass separation but to plasma excitation. Of course, an ion implantation method using mass separation may be used. In this step, phosphorus is added to the crystalline silicon film through the protection film 3104.

Next, the protection film 3104 is removed, and an irradiation step of a laser beam is again carried out by a method described in the embodiments 1 to 3. In this embodiment, laser annealing is carried out by using the optical system described in embodiment 2. Although pulsed oscillation or continuous-wave excimer laser light is desirable as the laser beam, continuous-wave argon laser light may be used.

However, since an object thereof is activation of added impurity elements, it is preferable to make irradiation with energy at such a level that the crystalline silicon film is not melted. It is also possible to carry out the laser annealing step while the protection film 3104 is kept remaining (FIG. 15(E)).

In this embodiment, pulsed oscillation excimer laser light is converted into linear light and the laser annealing step was carried out. The laser annealing condition was such that a KrF gas is used as an excitation gas, treatment temperature is adjusted to room temperature, the frequency of pulsed oscillation is set to 30 Hz, and the density of laser energy is set to 100 to 300 mJ/cm$^2$ (representatively 150 to 250 mJ/cm$^2$).

The laser annealing step carried out under the above condition has effects to activate the added impurity elements for giving n type or p type and to recrystallize the semiconductor film which has been made amorphous at addition of the impurity elements. The above condition is preferably such that atomic arrangement is aligned without melting the semiconductor film, and the impurity elements are activated. This step may be called a step of activating an impurity element for giving n type or p type by laser annealing, a step of recrystallizing a semiconductor film, or a step of carrying out both at the same time. In this embodiment, such a condition will be referred to as a second annealing condition.

By this step, boundary portions of the n-type impurity regions (b) 3111 to 3113, that is, junction portions to intrinsic regions (the p-type impurity region (b) is also regarded as substantially intrinsic) existing around the n-type impurity regions (b) become definite. This means that at the point of time when a TFT is subsequently completed, the LDD region and a channel formation region can form a very excellent junction portion.

When the impurity element is activated by the laser beam, activation by a heat treatment may be employed together with it. In the case where activation by the heat treatment is carried out, the heat treatment at about 450 to 550° C. is appropriate in view of the heat resistance of the substrate.

Next, unnecessary portions of the crystalline silicon film are removed and island-like semiconductor films (hereinafter referred to as active layers) 3114 to 3117 are formed (FIG. 15(F)).

Next, a gate insulating film 3118 covering the active layers 3114 to 3117 is formed. It is appropriate that the gate insulating film 3118 is formed to have a thickness of 10 to 200 nm, preferably 50 to 150 nm. In this embodiment, a silicon nitride oxide film with a thickness of 115 nm is formed by a plasma CVD method using $N_2O$ and $SiH_4$ as a raw material (FIG. 16(A)).

Next, a conductive film to become a gate wiring line is formed. Although the gate wiring line may be formed of a conductive film of a single layer, it is preferable to make a laminated film such as a two-layer or three-layer film according to necessity. In this embodiment, a laminated film made of a first conductive film 3119 and a second conductive film 3120 is formed (FIG. 16(B)).

Here, as the first conductive film 3119 and the second conductive film 3120, it is possible to use an element selected from tantalum (Ta), titanium (Ti), molybdenum (Mo), tungsten (W), chromium (Cr), and silicon (Si), a conductive film containing mainly the foregoing element (representatively, tantalum nitride film, tungsten nitride film, titanium nitride film), or an alloy film containing a combination of the foregoing elements (representatively, Mo—W alloy, Mo—Ta alloy).

It is appropriate that the thickness of the first conductive film 3119 is 10 to 50 nm (preferably 20 to 30 nm), and the thickness of the second conductive film 3120 is 200 to 400 nm (preferably 250 to 350 nm). In this embodiment, a tungsten nitride (WN) film with a thickness of 50 nm is used as the first conductive film 3119, and a tungsten film with a thickness of 350 nm is used as the second conductive film 3120.

Although not shown, it is effective that a silicon film with a thickness of about 2 to 20 nm is previously formed under the first conductive film 3119. By this, it is possible to improve the adhesiveness of the conductive film formed thereon and to prevent oxidation.

Next, the first conductive film 3119 and the second conductive film 3120 are etched at the same time to form gate wiring lines 3121 to 3124 with a thickness of 400 nm. At this time, the gate wiring lines 3122 and 3123 formed in the driver circuit are formed to overlap with a part of the n-type impurity regions (b) 3111 to 3113 through the gate insulating film. This overlapping portion subsequently becomes a Lov region. Although the gate wiring line 3124 is seen double in section, it is actually formed of one continuously connected pattern (FIG. 16(C)).

Next, an n-type impurity element (in this embodiment, phosphorus) is added by using the gate wiring lines 3121 to 3124 as masks in a self-aligning manner. It was adjusted such that phosphorus with a concentration of ½ to 1/10 (representatively ⅓ to ¼) of that of the n-type impurity region (b) (however, the concentration is 5 to 10 times as high as the concentration of boron added in the foregoing channel doping step, representatively $1\times10^{16}$ to $5\times10^{18}$ atoms/cm$^3$, typically $3\times10^{17}$ to $3\times10^{18}$ atoms/cm$^3$) is added to the thus formed impurity regions 3125 to 3130. Note that in this embodiment, an impurity region containing an n-type impurity element within the above concentration range is defined as an n-type impurity region (c) (FIG. 16(D)).

Although phosphorus with a concentration of $1\times10^{16}$ to $5\times10^{18}$ atoms/cm$^3$ is added also to all the n-type impurity regions (b) except portions concealed with the gate wiring lines, since its concentration is very low, it does not affect the function as the n-type impurity region (b). Besides, although boron with a concentration of $1\times10^{15}$ to $1\times10^{18}$ atoms/cm$^3$ is already added in the n-type impurity regions (b) 3127 to 3130 at the channel doping step, in this step, since phosphorus with a concentration 5 to 10 times as high as boron contained in the p-type impurity region (b) is added, it is permissible to consider that boron does not affect the function of the n-type impurity region (b) in this case as well.

However, strictly, among the n-type impurity regions (b) 3111 to 3113, in contrast to the concentration of phosphorus in the portion overlapping with the gate wiring line keeps $2\times10^{16}$ to $5\times10^{19}$ atoms/cm$^3$, in the portion not overlapping with the gate wiring line, phosphorus with a concentration of $1\times10^{16}$ to $5\times10^{18}$ atoms/cm$^3$ is added thereto, so that phosphorus with a slightly high concentration is contained.

Next, the gate insulating film 3118 is etched with the gate wiring lines 3121 to 3124 as masks in a self-aligning manner. A dry etching method is used as etching, and a CHF$_3$ gas is used as an etching gas. However, it is not necessary to limit the etching gas to this. In this way, gate insulating films 3131 to 3134 are formed under the gate wiring lines (FIG. 16(E)).

The active layers are exposed in this way, so that it is possible to lower an acceleration voltage when an adding step of impurity elements is next carried out. Besides, since a necessary dosage can be made low, a throughput is improved. Of course, the gate insulating film may not be etched but remained to form an impurity region by through doping.

Next, resist masks 3135 to 3138 to cover the gate wiring lines are formed, and an n-type impurity element (in this embodiment, phosphorus) is added to form impurity regions 3139 to 3147 containing phosphorus with a high concentration. Also in this case, an ion doping method (of course, an ion implantation method may be used) using phosphine (PH$_3$) is used, and the concentration of phosphorus in the regions is $1\times10^{20}$ to $1\times10^{21}$ atoms/cm$^3$ (representatively $2\times10^{20}$ to $5\times10^{21}$ atoms/cm$^3$) (FIG. 16(F)).

Note that in this embodiment, an impurity region containing an n-type impurity element within the above concentration range is defined as an n-type impurity region (a). Although phosphorus or boron added in the former step is already contained in the regions where the impurity regions 3139 to 3147 are formed, since phosphorus with a sufficiently high concentration is added, the influence of phosphorus or boron added in the former step does not have to be considered. Thus, in this embodiment, it does not matter if the impurity regions 3139 to 3147 are rephrased by n-type impurity regions (a).

Next, the resist masks 3135 to 3139 are removed, and a resist mask 3148 is newly formed. Then a p-type impurity element (in this embodiment, boron) is added to form impurity regions 3149 and 3150 containing boron with a high concentration. Here, boron with a concentration of $3\times10^{20}$ to $3\times10^{21}$ atoms/cm$^3$ (representatively $5\times10^{20}$ to $1\times10^{21}$ atoms/cm$^3$) is added by an ion doping method using diborane (B$_2$H$_6$) (of course, an ion implantation method may be used). Note that in this embodiment, an impurity region containing a p-type impurity element within the above concentration range is defined as a p-type impurity region (a) (FIG. 17(A)).

Although phosphorus with a concentration of $1\times10^{20}$ to $1\times10^{21}$ atoms/cm$^3$ is added in a part of the impurity regions 3149 and 3150 (foregoing n-type impurity regions (a) 3139 and 3140), boron added here is added with a concentration at least 3 times as high as that. Thus, the previously formed n-type impurity regions are completely inverted into p-type, and function as p-type impurity regions. Thus, in this embodiment, it does not matter if the impurity regions 3149 and 3150 are rephrased by p-type impurity regions (a).

Next, after the resist mask 3148 is removed, a first interlayer insulating film 3151 is formed. The first interlayer insulating film 3151 is appropriately formed of an insulating film containing silicon, specifically, a silicon nitride film, a silicon oxide film, a silicon nitride oxide film, or a laminated film containing a combination of those films. The film thickness is appropriately 100 to 400 nm. In this embodiment, a silicon nitride oxide film (concentration of nitrogen is 25 to 50 atomic %) having a thickness of 200 nm and formed by a plasma CVD method with SiH$_4$, N$_2$O, NH$_3$ as a raw material gas is used.

Thereafter, a heat treatment step for activating the n-type or p-type impurity element added in each concentration is carried out. This step can be carried out by a furnace annealing method, a laser annealing method, or a rapid thermal annealing method (RTA method). Here, although an activating step is carried out by the furnace annealing method, it is also effective to use laser annealing described in the embodiments 1 to 3. A heat treatment is performed at 300 to 650° C., preferably 400 to 550° C., here, 550° C. for four hours in a nitrogen atmosphere (FIG. 17(B)).

At this time, in this embodiment, the catalytic elements (in this embodiment, nickel) used for crystallization of the amorphous silicon film move in the directions indicated by arrows, and are captured (gettered) in the regions which are formed in the above step of FIG. 16(F) and containing phosphorus with a high concentration. This is a phenomenon caused by a gettering effect of phosphorus for a metal element, and as a result, in subsequent channel formation regions 3152 to 3156, the concentration of the catalytic element became $1\times10^{17}$ atoms/cm$^3$ or less (preferably $1\times10^{16}$ atoms/cm$^3$ or less).

Conversely, in the regions which became gettering sites of the catalytic element (regions where the impurity regions 3139 to 3147 are formed in the step of FIG. 16(F)), the catalytic element with a high concentration is segregated and the catalytic element with a concentration of $5\times10^{18}$ atoms/cm$^3$ or more (representatively, $1\times10^{19}$ to $5\times10^{20}$ atoms/cm$^3$) come to exist.

Further, a heat treatment at 300 to 450° C. for 1 to 12 hours is carried out in an atmosphere containing hydrogen of 3 to 100%, and a step of hydrogenating the active layers is carried out. This step is a step of terminating dangling bonds in the semiconductor layer by thermally excited hydrogen. As other means of hydrogenating, plasma hydrogenating (using hydrogen excited by plasma) may be carried out.

After the activating step is completed, a second interlayer insulating film 3157 with a thickness of 500 nm to 1.5 µm is formed on the first interlayer insulating film 3151. In this embodiment, a silicon oxide film with a thickness of 800 nm is formed as the second interlayer insulating film 3157 by a plasma CVD method. In this way, an interlayer insulating film having a thickness of 1 µm and made of the first interlayer insulating film (silicon nitride oxide film) 3151 and the second interlayer insulating film (silicon oxide film) 3157 is formed.

As the second interlayer insulating film 3157, an organic resin film of polyimide, acrylic resin, polyamide, polyimideamide, BCB (benzocyclobutene) or the like may be used.

Thereafter, a contact hole reaching a source region or drain region of each TFT is formed, and source wiring lines 3158 to 3161, and drain wiring lines 3162 to 3165 are formed. Although not shown, for the purpose of forming the CMOS circuit, the drain wiring lines 3162 and 3163 are connected as the same wiring line. Besides, although not shown, in this embodiment, this electrode is made to have a three-layer structure laminated film in which a Ti film with a thickness of 100 nm, an aluminum film containing Ti and having a thickness of 300 nm, and a Ti film having a thickness of 150 nm are continuously formed by a sputtering method.

Next, as a passivation film 3166, a silicon nitride film, a silicon oxide film, or a silicon nitride oxide film is formed to have a thickness of 50 to 500 nm (representatively, 200 to 300 nm). At this time, in this embodiment, prior to formation of the film, a plasma treatment using a gas containing hydrogen, such as $H_2$ or $NH_3$, is carried out, and a heat treatment is carried out after the film formation. Hydrogen excited by this preliminary treatment is supplied to the first and second interlayer insulating films. By carrying out the heat treatment in this state, the film quality of the passivation film 3166 is improved, and it is possible to effectively hydrogenate the active layer since hydrogen added in the first and second interlayer insulating films is diffused to the under layer side.

Besides, after the passivation film 3166 is formed, a hydrogenating step may be further carried out. For example, it is appropriate that a heat treatment at 300 to 450° C. for 1 to 12 hours is carried out in an atmosphere containing hydrogen of 3 to 100%. Alternatively, also when a plasma hydrogenating method was used, the same effect is obtained. Here, at a position where a contact hole for connecting a pixel electrode to the drain wiring line is subsequently formed, an opening portion may be formed in the passivation film 3166.

Thereafter, a third interlayer insulating film 3167 made of organic resin and having a thickness of about 1 µm is formed. As the organic resin, polyimide, acryl, polyamide, polyimideamide, BCB (benzocyclobutene) or the like can be used. As merits of using the organic resin film, there are cited a point that a film forming method is simple, a point that parasitic capacity can be reduced since relative dielectric constant is low, a point that excellent flatness is obtained, and the like. Note that an organic resin film other than those mentioned above, organic SiO compound, and the like can also be used. Here, polyimide of a type that is thermally polymerized after application to the substrate is used and fired at 300° C. to form the film.

Next, in the region to be a pixel portion, a shielding film 3168 is formed on the third interlayer insulating film 3167. Note that in this embodiment, the word "shielding film" is used to carry the meaning of shielding against light and electromagnetic waves.

As the shielding film 3168, a film made of an element selected from aluminum (Al), titanium (Ti), and tantalum (Ta) or a film containing either one of those elements as its main ingredient is formed to have a thickness of 100 to 300 nm. In this embodiment, an aluminum film containing titanium of 1 wt % and having a thickness of 125 nm was formed.

Note that when an insulating film made of a silicon oxide film or the like and having a thickness of 5 to 50 nm is formed on the third interlayer insulating film 3167, it is possible to improve the adhesiveness of the shielding film formed thereon. Besides, when a plasma treatment using a $CF_4$ gas is applied to the surface of the third interlayer insulating film 3167 formed of organic resin, it is possible to improve the adhesiveness of the shielding film formed on the film owing to surface reforming.

It is also possible to form not only the shielding film but other connection wiring lines by using the aluminum film containing titanium. For example, connecting wiring lines for connecting circuits in the driver circuit can be formed. However, in that case, it is necessary to form a contact hole in the third interlayer insulating film prior to film formation with a raw material for forming the shielding film or the connecting wiring line.

Next, an oxide 3169 with a thickness of 20 to 100 nm (preferably 30 to 50 nm) is formed on the surface of the shielding film 3168 by an anodic oxidation method or a plasma oxidation method (in this embodiment, anodic oxidation method). In this embodiment, since the film mainly containing aluminum is used as the shielding film 3168, an aluminum oxide film (alumina film) is formed as the anodic oxide 3169.

At this anodic oxidation treatment, an ethylene glycol tartrate solution with a sufficiently low alkaline ion concentration is prepared. This is a mixture solution in which an ammonium tartrate aqueous solution of 15% and ethylene glycol are mixed at 2:8, and ammonia water is added to this solution to make adjustment so that pH becomes 7±0.5. Then a platinum electrode as a cathode is provided in this solution, the substrate on which the shielding film 3168 is formed is immersed in the solution, and a constant (several mA to several tens mA) direct current is made to flow with the shielding film 3168 as an anode.

Although a voltage between the cathode and the anode in the solution was changed with a lapse of time in accordance with the growth of an anodic oxide, the voltage is raised at a voltage rising rate of 100 V/min while the constant current is kept, and the anodic oxidation treatment is ended when the voltage reached reachable voltage of 45V. In this way, it is possible to form an anodic oxide 3169 with a thickness of about 50 nm on the surface of the shielding film 3168. As a result, the thickness of the shielding film 3168 becomes 90 nm. Note that numerical values relating to the anodic oxidation method shown here are merely examples, and optimum values can be naturally changed by the size and the like of a component to be manufactured.

Besides, although such a structure is adopted here that the insulating film is provided only on the surface of the shielding film by using the anodic oxidation method, the insulating film may be formed by a vapor phase method such as a plasma CVD method, a thermal CVD method, or a sputtering method. In that case as well, it is preferable to set the film thickness to 20 to 100 nm (preferably 30 to 50 nm). Besides, a silicon oxide film, a silicon nitride film, a silicon nitride oxide film, a DLC (Diamond like carbon) film, or an organic resin film may be used. Further, a laminated film of a combination of these may be used.

Next, a contact hole reaching the drain wiring line 3165 is formed in the third interlayer insulating film 3167 and the passivation film 3166, and a pixel electrode 3170 is formed. Note that pixel electrodes 3171 and 3172 are pixel electrodes of adjacent different pixels, respectively. It is appropriate that in the case where a transmission type liquid crystal display device is formed, a transparent conductive film is used for the pixel electrodes 3170 to 3172, and in the case where a reflection type liquid crystal display device is formed, a metal film is used. Here, for the purpose of forming the transmission type liquid crystal display device, an indium-tin oxide (ITO) film with a thickness of 110 nm is formed by a sputtering method.

At this time, the pixel electrode 3170 and the shielding film 3168 overlap with each other through the anodic oxide 3169, so that a holding capacitance (capacitance storage) 3173 is formed. In this case, it is desirable that the shielding film 3168 is set at a floating state (electrically isolated state) or to a fixed potential, preferably to a common potential (intermediate potential of an image signal transmitted as data).

In this way, an active matrix substrate including the driver circuit and the pixel portion on the same substrate is completed. In FIG. 17(C), a p-channel TFT 3301, and n-channel TFTs 3302 and 3303 are formed in the driver circuit, and a pixel TFT 3304 made of an n-channel TFT is formed in the pixel portion.

In the p-channel TFT 3301 of the driver circuit, a channel formation region 3201, a source region 3202, and a drain region 3203 are formed of the p-type impurity regions (a), respectively. However, actually, there exists a region containing phosphorus with a concentration of $1\times10^{20}$ to $1\times10^{21}$ atoms/cm$^3$ in a part of the source region or drain region. Besides, in that region, there exists a catalytic element gettered in the step of FIG. 17(B) and having a concentration of $5\times10^{18}$ atoms/cm$^3$ or more (representatively, $1\times10^{19}$ to $5\times10^{20}$ atoms/cm$^3$).

In the n-channel TFT 3302, a channel formation region 3204, a source region 3205, a drain region 3206, and a region 3207 disposed at one side of the channel formation region (drain region side) and overlapping with the gate wiring line through the gate insulating film (in this embodiment, such a region is referred to as a Lov region. The "ov" is affixed to denote "overlap") are formed. At this time, the Lov region 3207 contained phosphorus with a concentration of $2\times10^{16}$ to $5\times10^{19}$ atoms/cm$^3$, and is formed to totally overlap with the gate wiring line.

In the n-channel TFT 3303, a channel formation region 3208, a source region 3209, a drain region 3210, and LDD regions 3211 and 3212 on both sides of the channel formation region are formed. In this structure, since a part of the LDD regions 3211 and 3212 is disposed to overlap with the gate wiring line, a region (Lov region) which overlaps with the gate wiring line through the gate insulating film and a region which does not overlap with the gate wiring line (in this embodiment, such a region will be referred to as Loff region. The "off" is affixed to denote "offset") are realized.

A sectional view shown in FIG. 19 is an enlarged view showing the state in which manufacture of the n-channel TFT 3303 shown in FIG. 17(C) proceeds up to the step of FIG. 17(B). As shown here, the LDD region 3211 can be divided into a Lov region 3211*a* and a Loff region 3211*b*. While the Lov region 3211*a* contains phosphorus with a concentration of $2\times10^{16}$ to $5\times10^{19}$ atoms/cm$^3$, the Loff region 3211*b* contains phosphorus with a concentration 1 to 2 times (representatively 1.2 to 1.5 times) as high as that.

In the pixel TFT 3304, channel formation regions 3213 and 3214, a source region 3215, a drain region 3216, Loff regions 3217 to 3220, and an n-type impurity region (a) 3221 being in contact with the Loff regions 3218 and 3219 are formed. At this time, the source region 3215 and the drain region 3216 are formed of the n-type impurity regions (a) respectively, and the Loff regions 3217 to 3220 are formed of the n-type impurity regions (c).

In this embodiment, the structure of a TFT forming each circuit is optimized in accordance with a circuit specification required by the pixel portion and the driver circuit, and it is possible to improve the operation performance and reliability of the semiconductor device. Specifically, in the n-channel TFT, the arrangement of the LDD region is made different in accordance with the circuit specification, and one of the Lov region and the Loff region is appropriately used, so that a TFT structure in which importance is attached to high speed operation or hot carrier measures, or a TFT structure in which importance is attached to low off current operation are realized.

For example, in the case of an active matrix type liquid crystal display device, the n-channel TFT 3302 is suitable for a driver circuit such as a shift register circuit, a frequency dividing circuit, a signal dividing circuit, a level shifter circuit, and a buffer circuit, in which importance is attached to high speed operation. That is, the Lov region is disposed at only one side (drain region side) of the channel formation region, so that such a structure is formed that a resistance component is reduced to the utmost degree and importance is attached to hot carrier measures. This is because in the case of the foregoing circuit group, the functions of the source region and the drain region are not different from each other, and the direction of movement of carriers (electrons) is constant. However, as the need arises, the Lov region can be disposed at both sides of the channel formation region.

The n-channel TFT 3303 is suitable for a sampling circuit (sample-hold circuit) in which importance is attached to both hot carrier measures and low off current operation. That is, the Lov region is disposed as the hot carrier measures, and the Loff region is disposed to realize the low off current operation. In the sampling circuit, the functions of the source region and the drain region are inverted and the moving direction of carriers is changed by 180°, so that it is necessary to make such a structure that axial symmetry is established with respect to the gate wiring line. Note that according to circumstances, there can be a case where only the Lov region exists.

The n-channel TFT 3304 is suitable for the pixel portion and the sampling circuit (sample-hold circuit) in which importance is attached to low off current operation. That is, the Lov region which can become a factor to increase an off current value is not disposed, but only the Loff region is disposed so that the low off current operation is realized. Besides, the LDD region with a concentration lower than that of the LDD region of the driver circuit is used as the Loff region, so that such measures are adopted that even if an on current value is lowered a little, an off current is thoroughly lowered. Further, it has been ascertained that the n-type impurity region (a) 3221 is very effective in lowering an off current value.

It is appropriate that as against the channel length of 3 to 7 μm, the length (width) of the Lov region 3207 of the n-channel TFT 3302 is 0.5 to 3.0 μm, representatively 1.0 to 1.5 μm. Besides, it is appropriate that the length (width) of the Lov regions 3211a and 3212a of the n-channel TFT 2303 is 0.5 to 3.0 μm, representatively 1.0 to 1.5 μm, and the length (width) of the Loff regions 3211b and 3212b is 1.0 to 3.5 μm, representatively 1.5 to 2.0 μm. Besides, it is appropriate that the length (width) of the Loff regions 3217 to 3220 provided in the pixel TFT 3304 is 0.5 to 3.5 μm, representatively 2.0 to 2.5 μm.

Further, one of the features of the present invention is that the p-channel TFT 3301 is formed in a self-aligning manner, and the n-channel TFTs 3302 to 3304 are formed in a non-self-aligning manner.

Besides, in this embodiment, an alumina film with a relative dielectric constant of as high as 7 to 9 is used as the dielectric of the holding capacitance, so that it is possible to reduce an area for forming required capacitance. Moreover, the shielding film formed on the pixel TFT functions as one of electrodes of the holding capacitance as in this embodiment, so that it is possible to improve the opening ratio of an image display portion of an active matrix type liquid crystal display device.

Note that the present invention is not necessarily limited to the structure of the holding capacitance shown in this embodiment. For example, the structure of a holding capacitance disclosed in Japanese Patent Application No. Hei 9-316567 or No. Hei 10-254097 by the present applicant can also be used.

As shown in FIG. 18, an oriented film 3401 is formed on the substrate in the state of FIG. 17(C). In this embodiment, a polyimide film was used as the oriented film. A transparent conductive film 3403 and an oriented film 3404 are formed on an opposite substrate 3402. A color filter and a shielding film may be formed on the opposite substrate as the need arises.

Next, after the oriented film is formed, a rubbing treatment is applied so that liquid crystal molecules are oriented with some uniform pre-tilt angle. Then the active matrix substrate on which the pixel portion and the driver circuit are formed is bonded to the opposite substrate by a well-known cell assembling step through a sealing material, a spacer (both not shown), and the like. Thereafter, a liquid crystal 3405 was injected between the substrates, and they are completely sealed with an end-sealing material (not shown). It is appropriate that a well-known liquid crystal material is used as the liquid crystal. In this way, the active matrix type liquid crystal display device as shown in FIG. 18 is completed.

Next, the structure of this active matrix type liquid crystal display device will be described with reference to a perspective view of FIG. 21. For the purpose of making FIG. 20 correspond to sectional structural views of FIGS. 15 to 17, common reference symbols are used. An active matrix substrate is constituted of a pixel portion 3601, a scanning (gate) signal driver circuit 3602, and an image (source) signal driver circuit 3603, which are formed on a glass substrate 3101. A pixel TFT 3304 of the pixel portion is an n-channel TFT, and the driver circuit provided on the periphery is constituted of a CMOS circuit as a base. The scanning signal driver circuit 3602 and the image signal driver circuit 3603 are connected to the pixel portion 3601 through a gate wiring line 3124 and a source wiring line 3161, respectively. Besides, there are provided connection wiring lines 3606 and 3607 extending from an external input/output terminal 3605 to which an FPC 3604 is connected to an input/output terminal of the driver circuit.

Embodiment 7

A CMOS circuit and a pixel matrix circuit formed through carrying out the present invention applied to various display apparatuses (an active matrix type liquid crystal display, an active matrix type El display and active matrix type EC display). Namely, the present invention may be applicable to all the electronic equipments that incorporate those display devices as the display medium.

As such an electronic equipment, a video camera, a digital camera, a projector (rear-type projector or front-type projector), a head mount display (goggle-type display), a navigation system for vehicles, a personal computer, and a portable information terminal (a mobile computer, a cellular phone, or an electronic book, etc.) may be enumerated. Examples of those are shown in FIGS. 23 to 24.

Figure 23A:
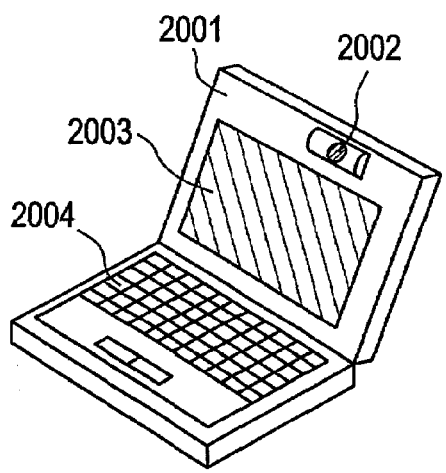
FIG. 23(A) shows a personal computer comprising a main body 2001, an image inputting unit 2002, a display device 2003, and a key board 2004. The present invention is applicable to the image inputting unit 2002, the display device 2003, and other signal control circuits.
Figure 23B:
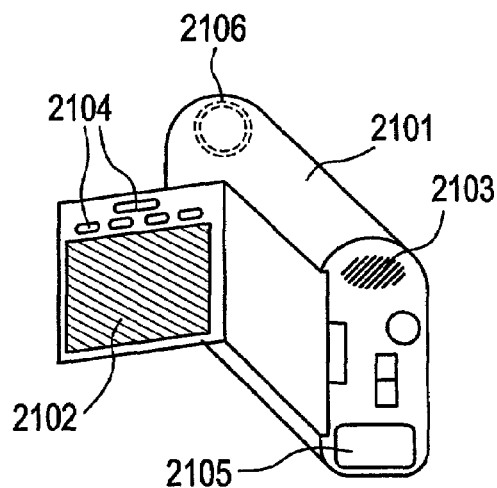
FIG. 23(B) shows a video camera comprising a main body 2101, a display device 2102, a voice input unit 2103, an operation switch 2104, a battery 2105, and an image receiving unit 2106. The present invention is applicable to the display device 2102, the voice input unit 2103, and other signal control circuits.
Figure 23C:
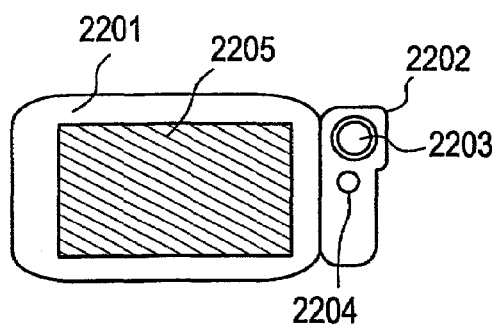
FIG. 23(C) shows a mobile computer comprising a main body 2201, a camera unit 2202, an image receiving unit 2203, an operation switch 2204, and a display device 2205. The present invention is applicable to the display device 2205 and other signal control circuits.
Figure 23D:
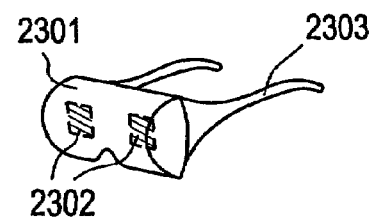
FIG. 23(D) shows a goggle-type display comprising a main body 2301, a display device 2302 and an arm portion 2303. The present invention is applicable to the display device 2302 and other signal control circuits.
Figure 23E:
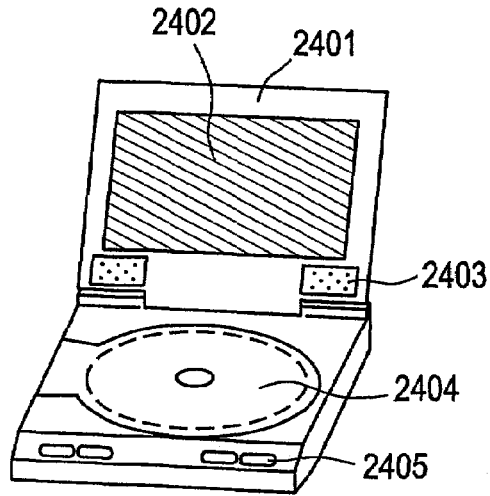

FIG. 23(E) shows a player that employs a recoding medium in which programs are recorded (hereinafter referred to as recording medium), and comprises a main body 2401, a display device 2402, a speaker unit 2403, a recording medium 2404, and an operation switch 2405. Note that this player uses as the recoding medium a DVD (digital versatile disc), a CD and the like to serve as a tool for enjoying music or movies, for playing games and for connecting to the Internet. The present invention is applicable to the display device 2402 and other signal control circuits.

Figure 23F:
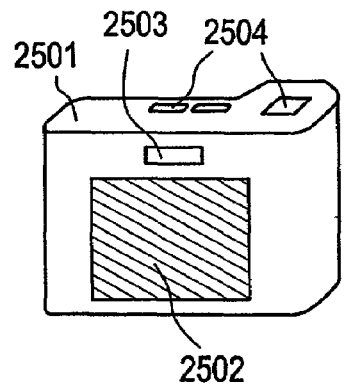

FIG. 23(F) shows a digital camera comprising a main body 2501, a display device 2502, an eye piece section 2503, an operation switch 2504, and an image receiving unit (not shown). The present invention is applicable to the display device 2502 and other signal control circuits.

Figure 24A:
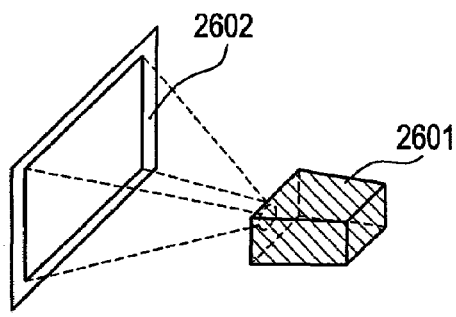

FIG. 24(A) shows a front-type projector comprising a display device 2601 and a screen 2602. The present invention is applicable to the display device and other signal control circuits.

Figure 24B:
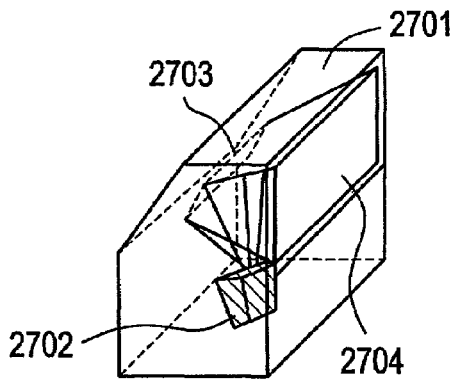

FIG. 24(B) shows a rear-type projector comprising a main body 2701, a display device 2702, a mirror 2703, and a screen 2704. The present invention is applicable to the display device and other signal control circuits.

Figure 24C:
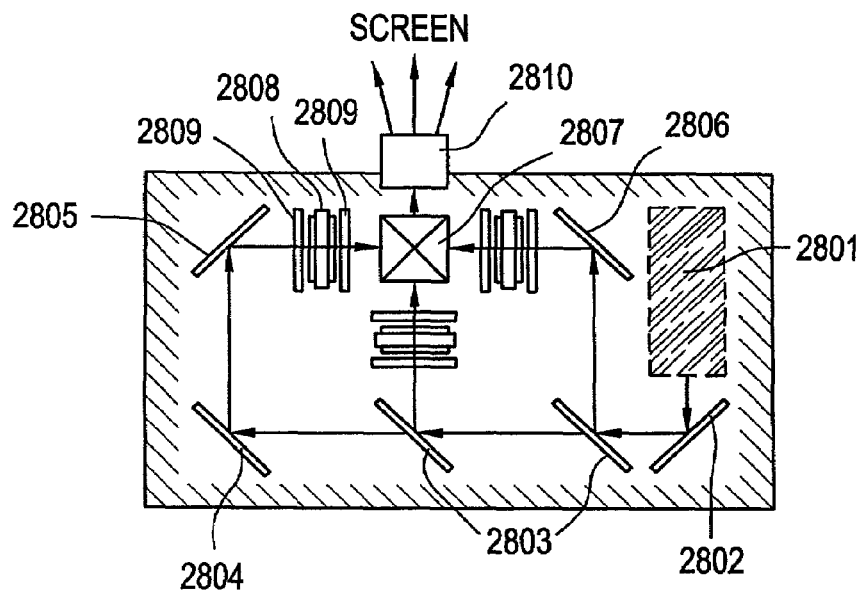

FIG. 24(C) is a diagram showing an example of the structure of the display devices 2601 and 2702 in FIGS. 24(A) and 24(B). The display device 2601 or 2702 comprises a light source optical system 2801, mirrors 2802 and 2804 to 2806, a dichroic mirror 2803, a prism 2807, a liquid crystal display device 2808, a phase difference plate 2809 and a projection optical system 2810. The projection optical system 2810 consists of an optical system including a projection lens. This embodiment shows an example of "three plate type", but not particularly limited thereto. For instance, the invention may be applied also to "single plate type". Further, in the light path indicated by an arrow in FIG. 24(C), an optical system such as an optical lens, a film having a polarization function, a film for adjusting a phase difference, an IR film may be provided on discretion of a person who carries out the invention.

Figure 24D:
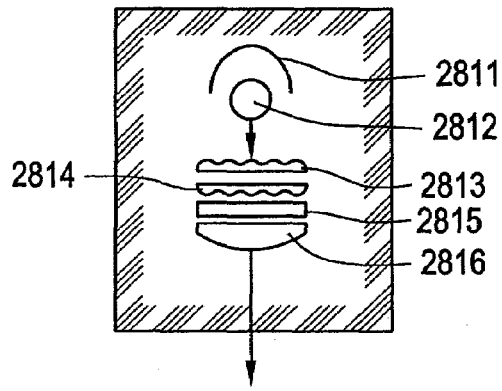

FIG. 24(D) is a diagram showing an example of the structure of the light source optical system 2801 in FIG. 24(C). In this embodiment, the light source optical system 2801 comprises a reflector 2811, a light source 2812, 2813 and 2814, a polarizing converter element 2815 and a collimator lens 2816. Note that the light source optical system shown in FIG. 24(D) is an example and not particularly limited thereto. For example, in the light source optical system, an optical system such as an optical lens, a film having a polarization function, a film for adjusting a phase difference, and an IR film may be provided on discretion of a person who carries out the invention.

As described above, the scope of application of the semiconductor device of the present invention is very wide, and the invention can be applied to electronic equipments of any fields. The electronic equipment of this embodiment can be realized even if any combination of Embodiments 1 to 17 is used.

EFFECT OF THE INVENTION

According to the present invention, uniform laser annealing became possible over the whole surface of the processed substrate. As a result, the characteristics of the semiconductor device within the substrate surface could be made uniform. In addition, the area of the laser beam to be irradiated on the surface to be formed can be made enlarge, thereby being capable of improving the productivity thereof.

Accordingly, in the case where an active matrix type liquid crystal display device, for example, is manufactured while employing the TFTs manufactured using the present invention, the display device with less stripe due to laser processing could be obtained compared to the conventional ones.

BRIEF DESCRIPTIONS OF THE DRAWINGS

Figure 1:
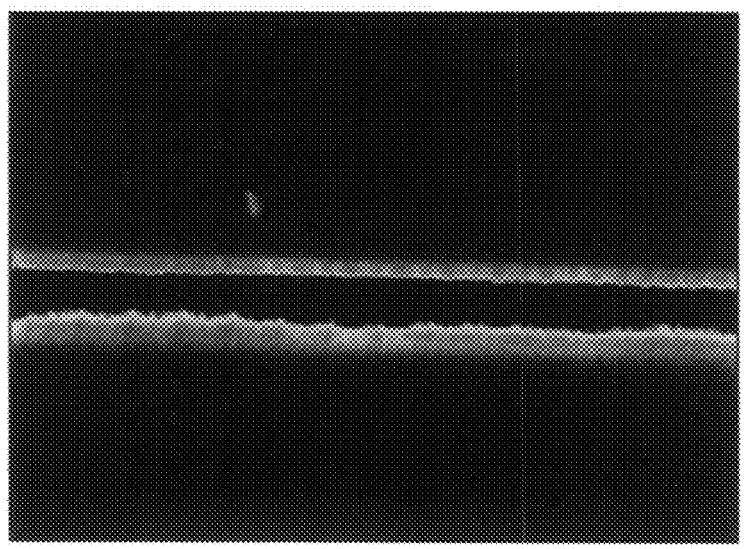

[FIG. 1] A photograph of a silicon film that has been irradiated with a conventional linear laser beam.

Figure 2A:
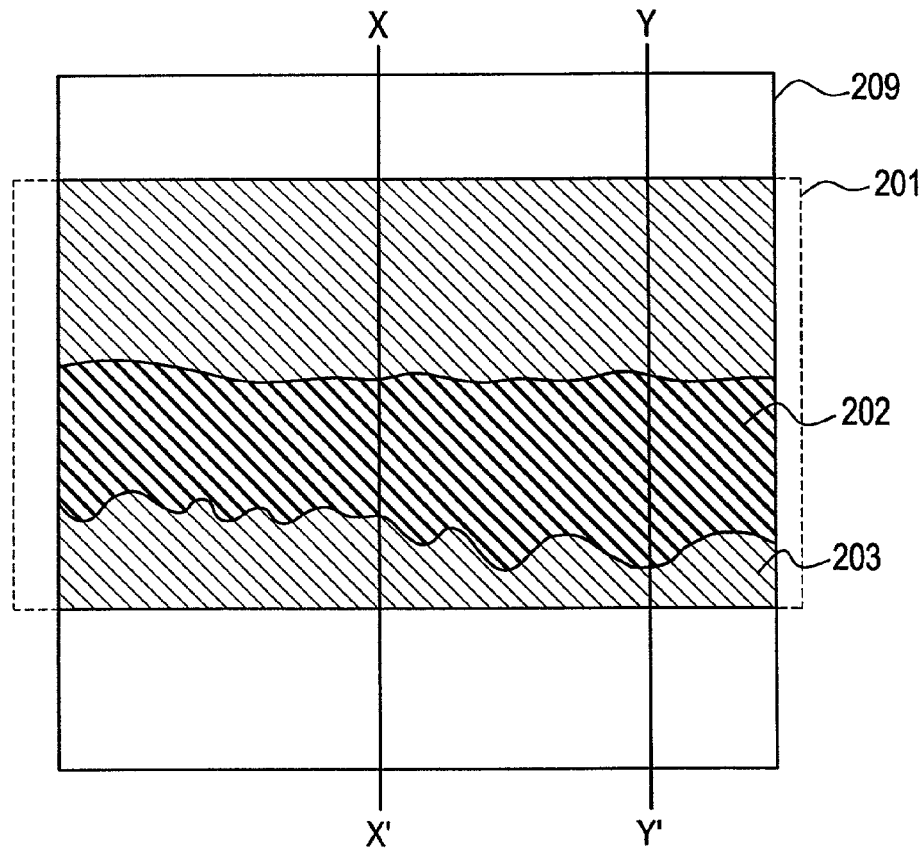
Figure 2B:
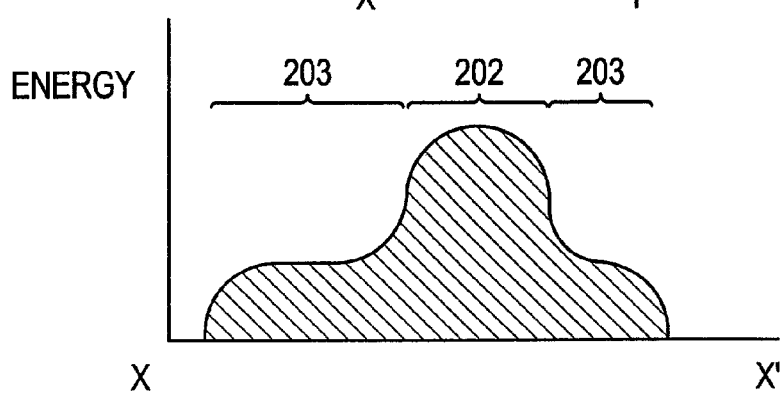
Figure 2C:
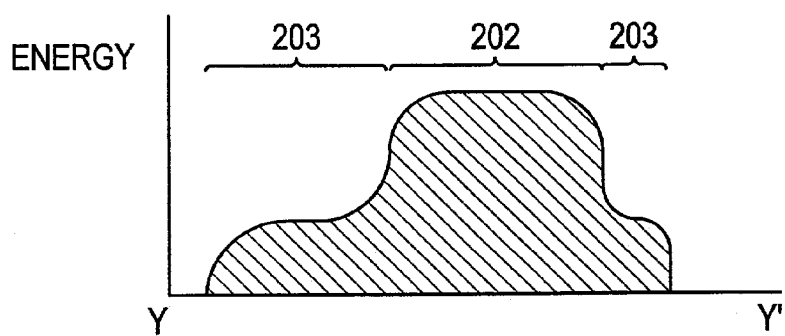

[FIGS. 2A-2C] Views schematically showing FIG. 1.

Figure 3:
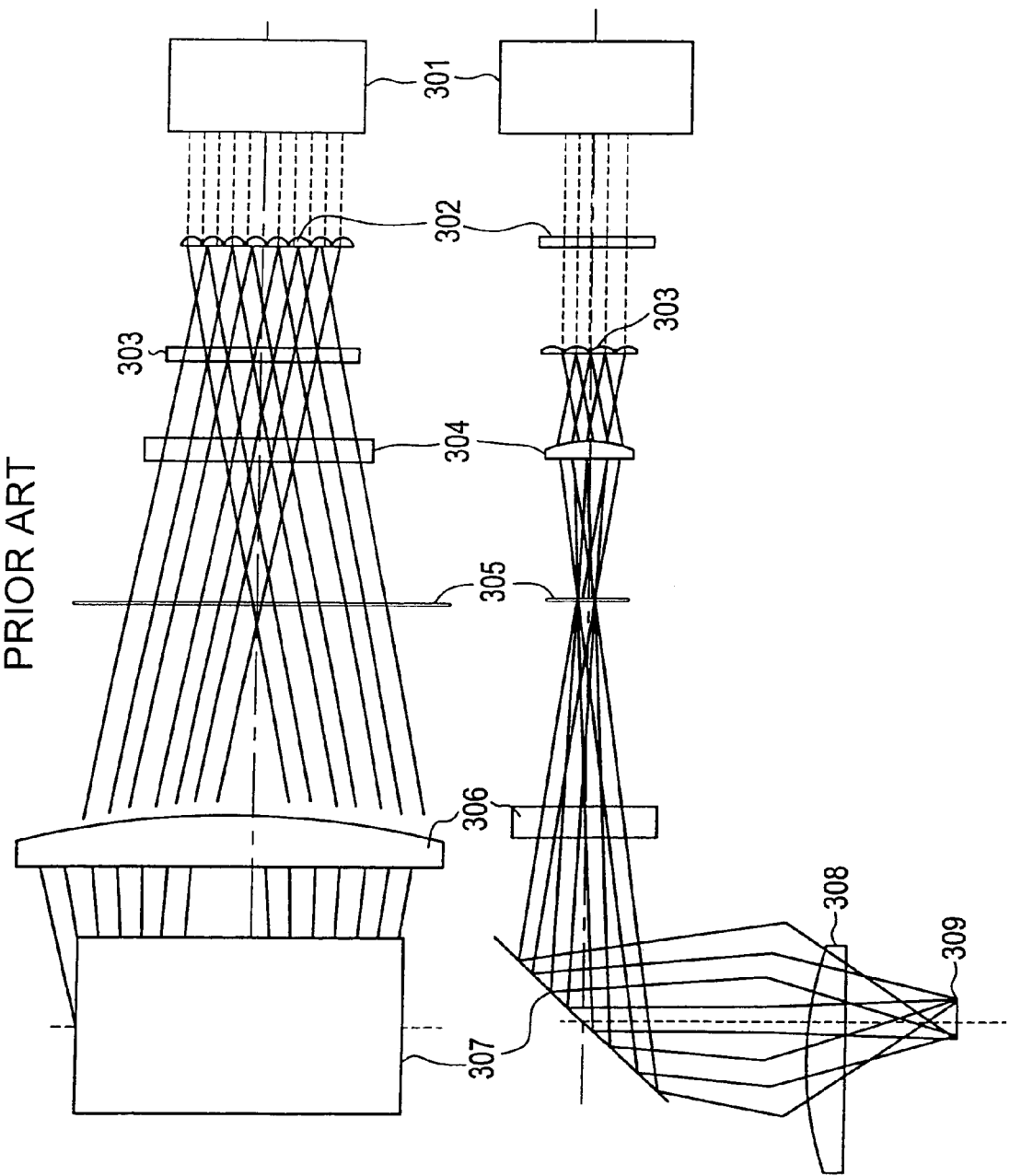

[FIG. 3] A view showing a conventional optical system and optical path for forming a linear laser beam.

[FIGS. 4A-4B] Views showing laser beams entering into the conventional optical system in which laser beam is divided.

Figure 5:
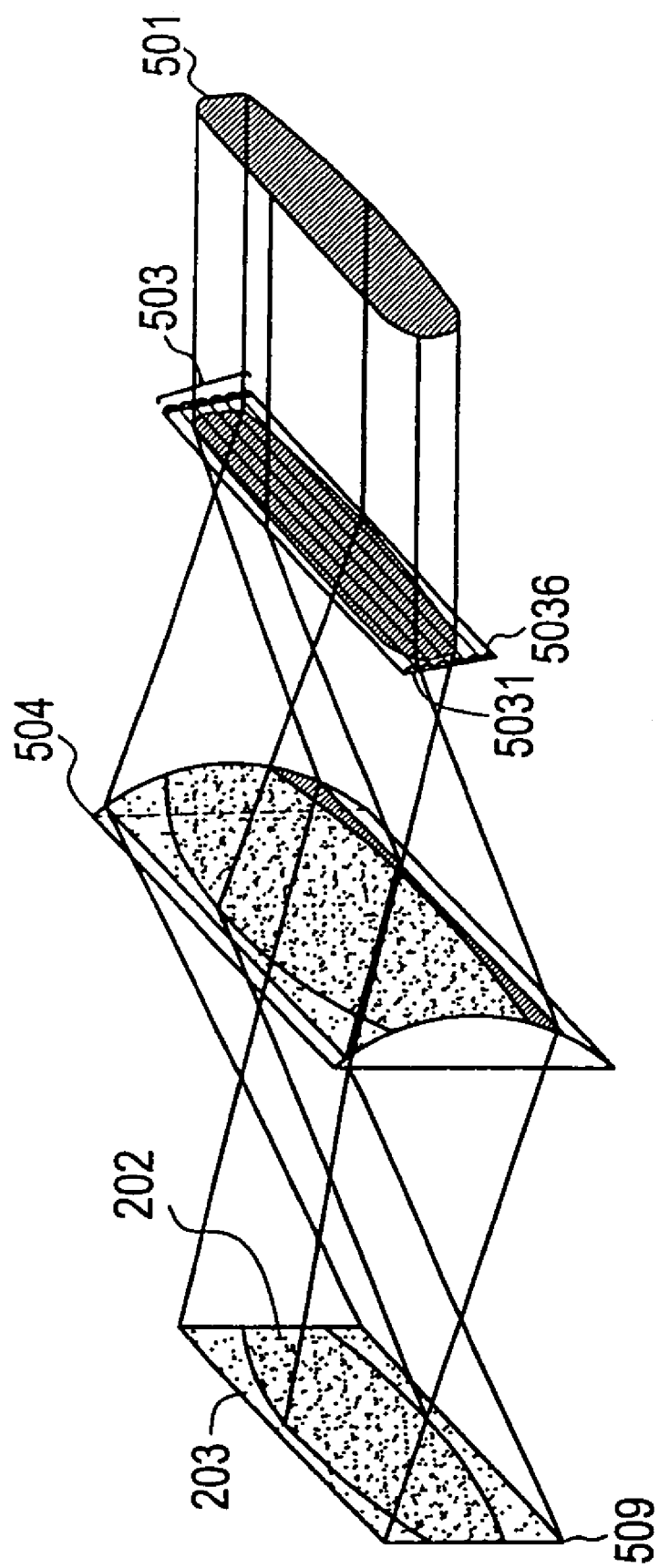

[FIG. 5] A view showing a conventional optical system and optical path for forming a linear laser beam.

Figure 6:
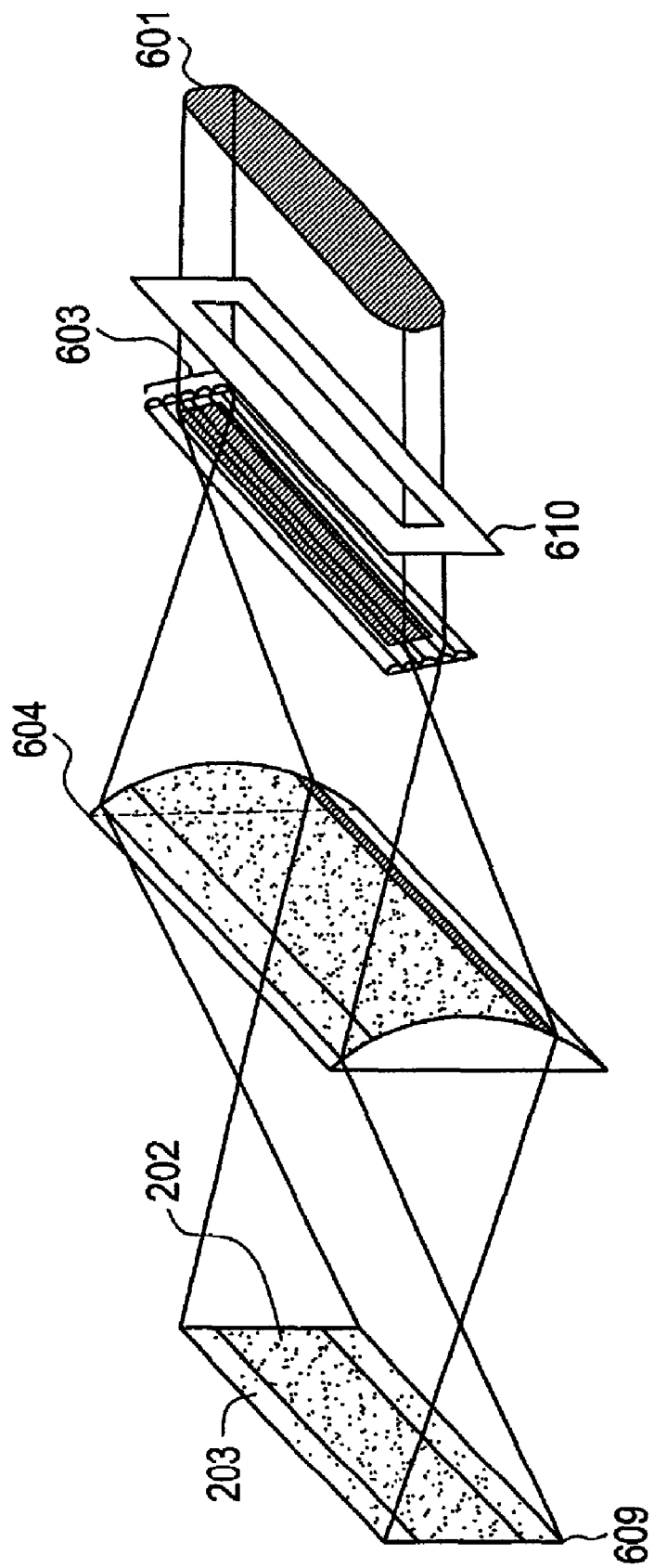

[FIG. 6] A view showing an optical system and optical path according to the present invention, for forming a linear laser beam.

Figure 7:
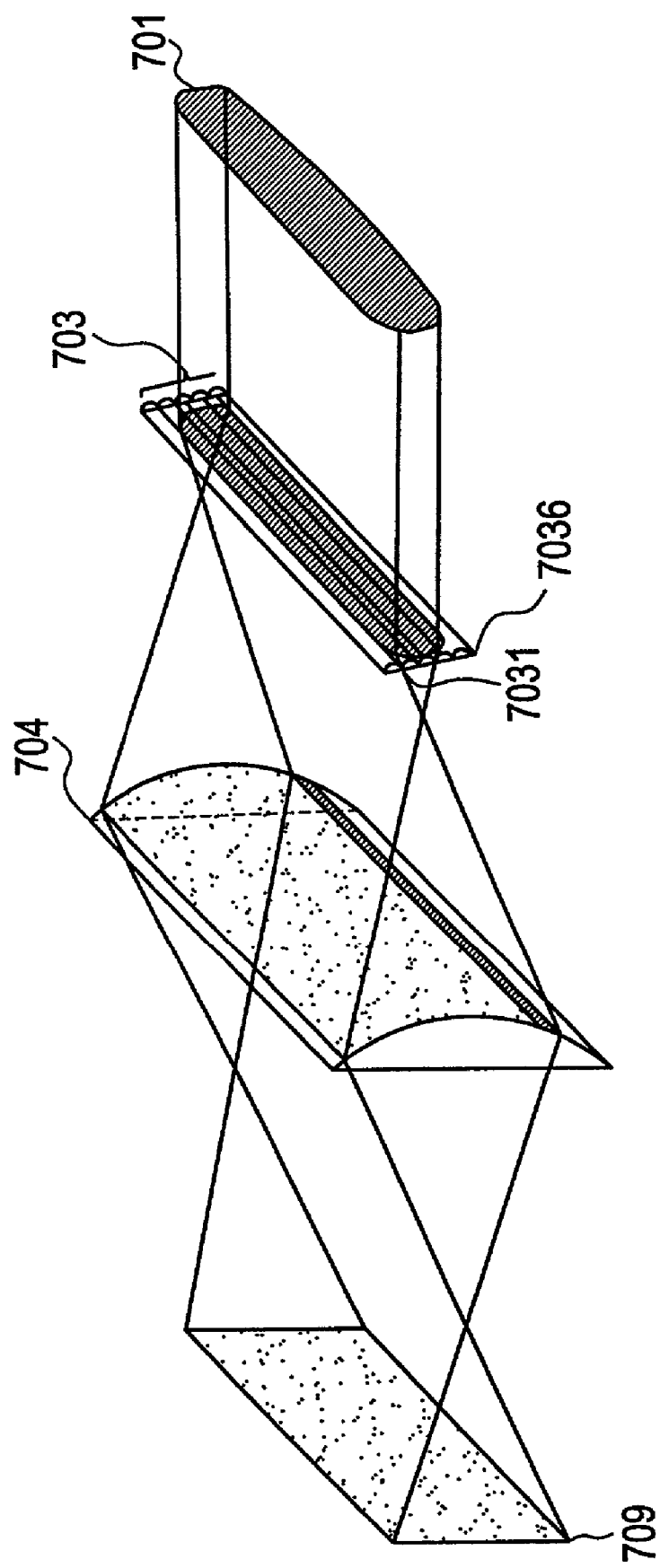

[FIG. 7] A view showing an optical system and optical path according to the present invention, for forming a linear laser beam.

Figure 8:
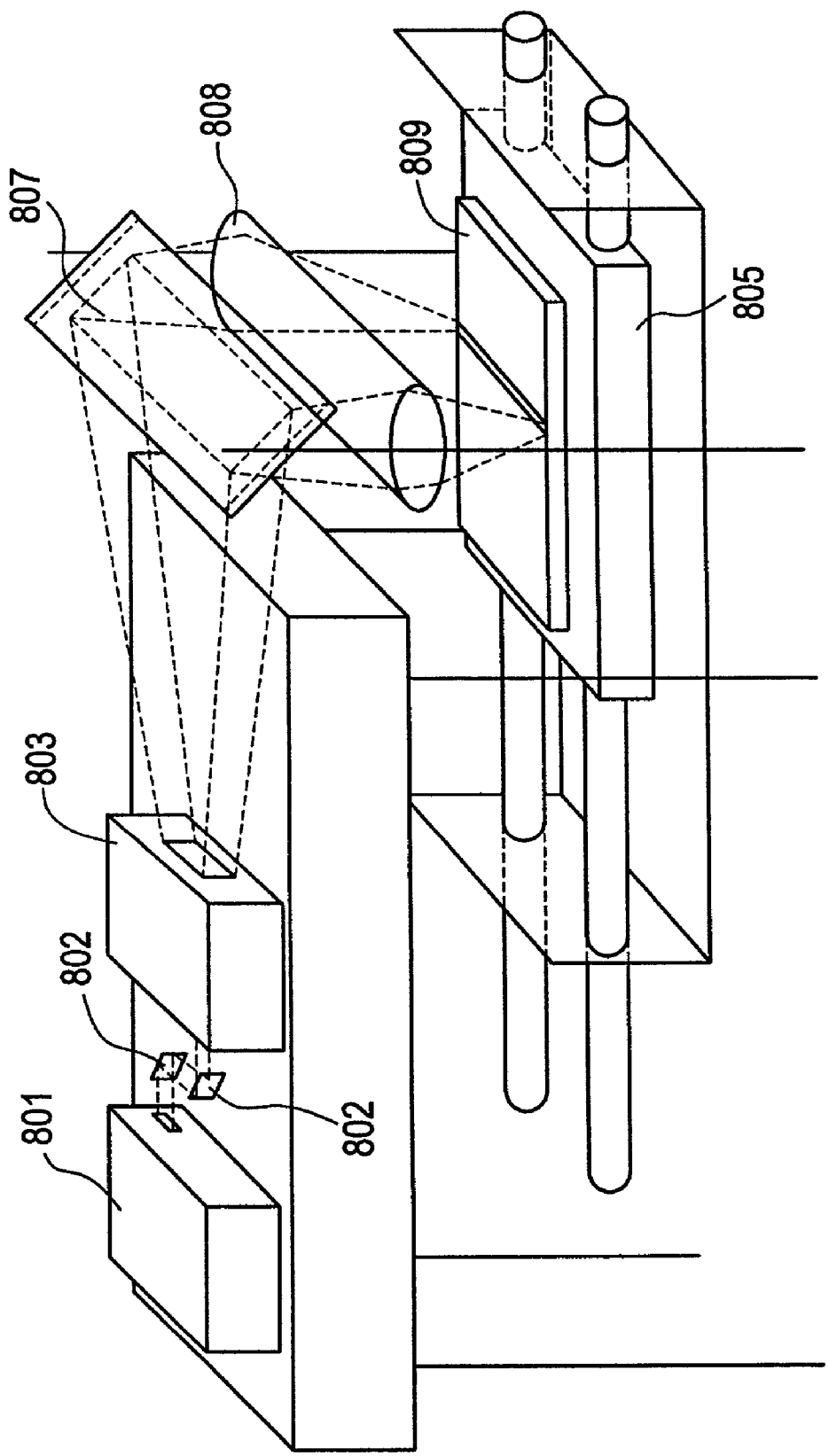

[FIG. 8] A schematic view of an laser irradiation apparatus.

Figure 9A:
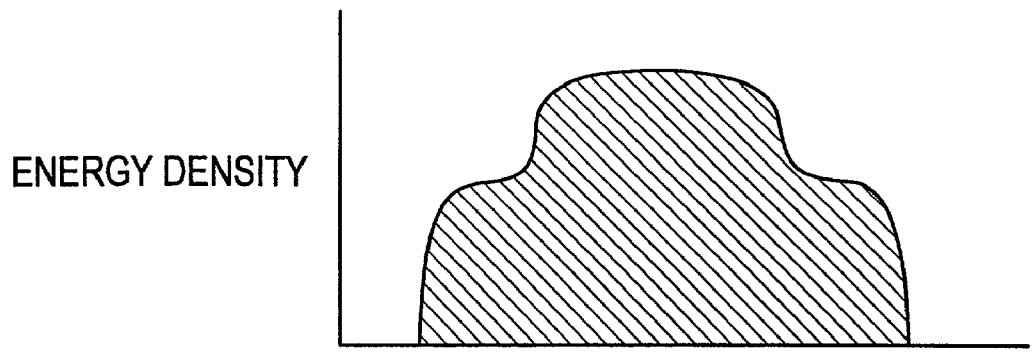
Figure 9B:
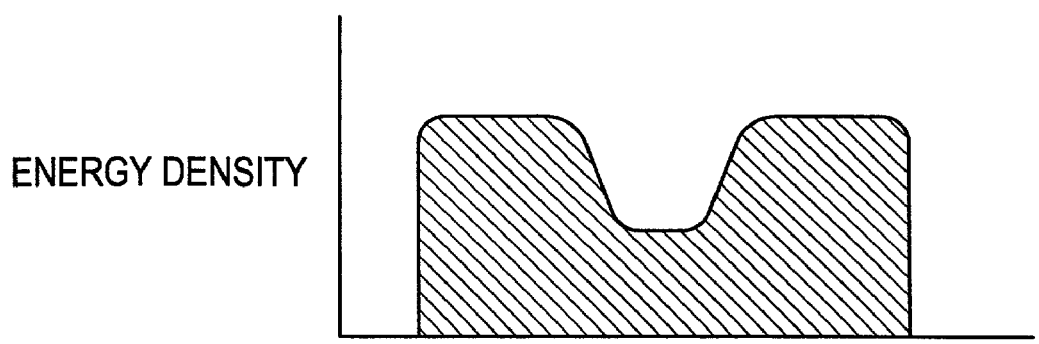
Figure 9C:
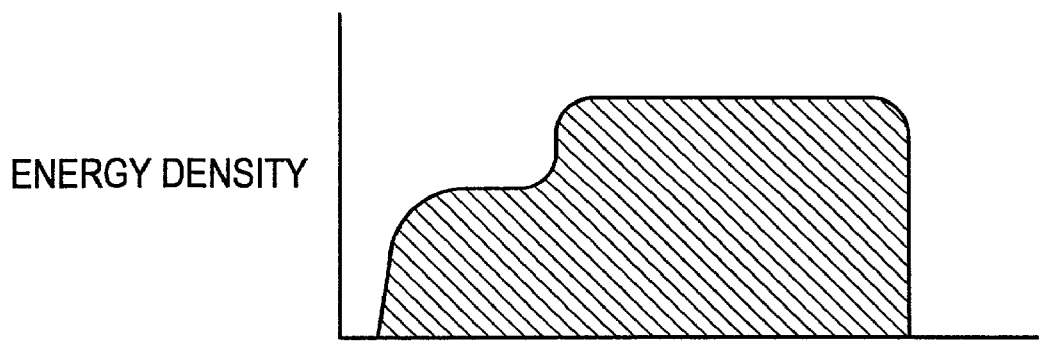

[FIGS. 9A-9C] Sectional views of the energy distributions of linear laser beams in the width directions.

Figure 10:
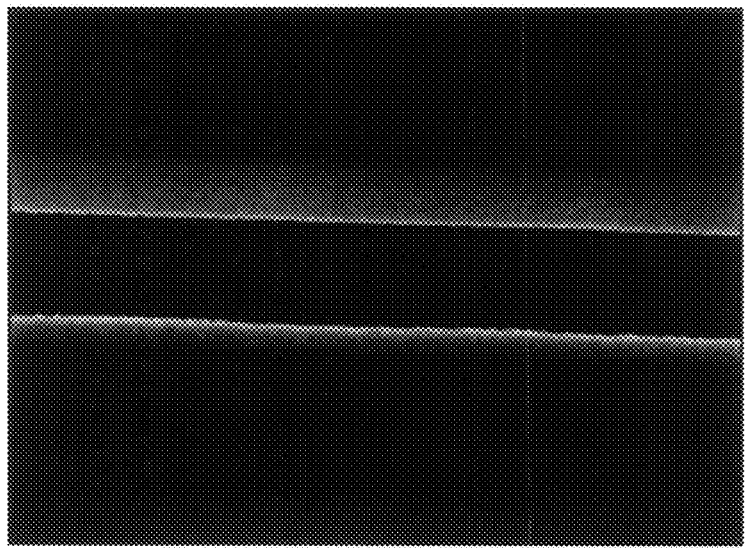

[FIG. 10] A photograph of a silicon film that has been irradiated with a linear laser beam according to the present invention.

Figure 11:
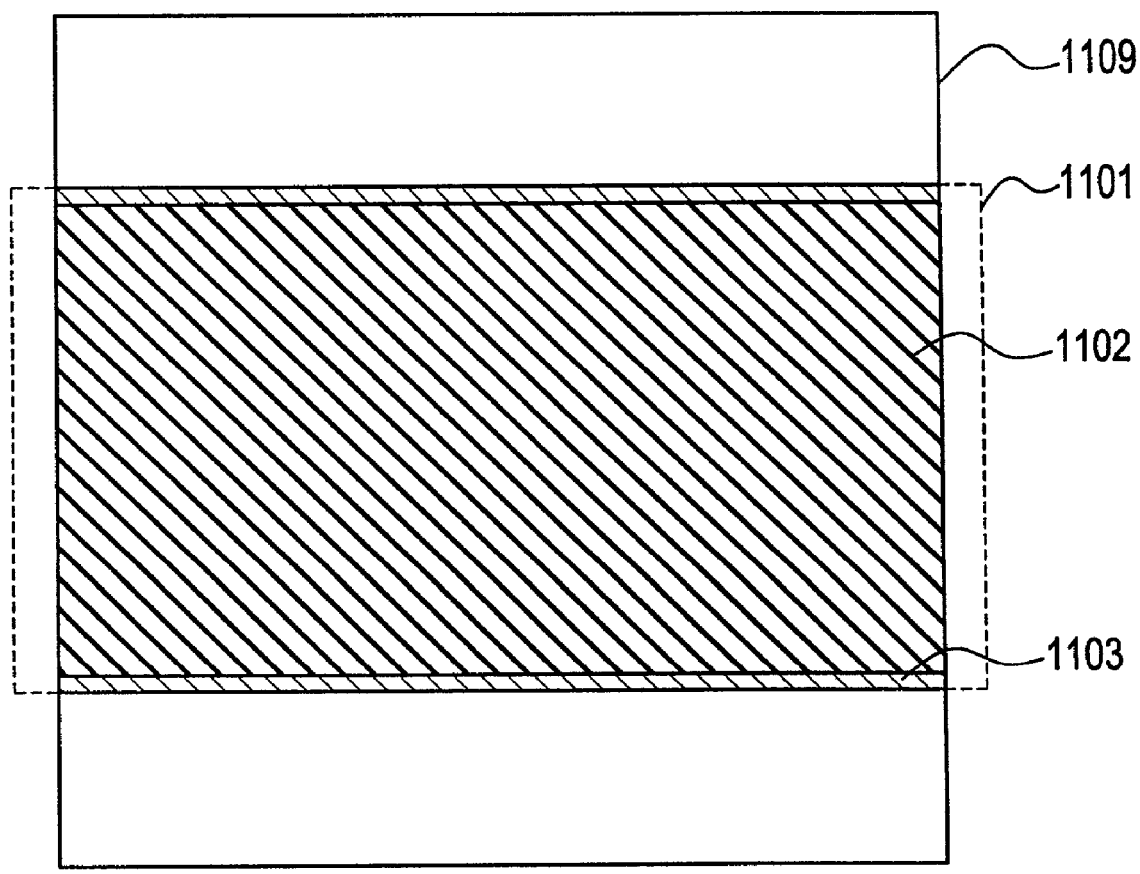

[FIG. 11] A view schematically showing FIG. 10.

Figure 12:
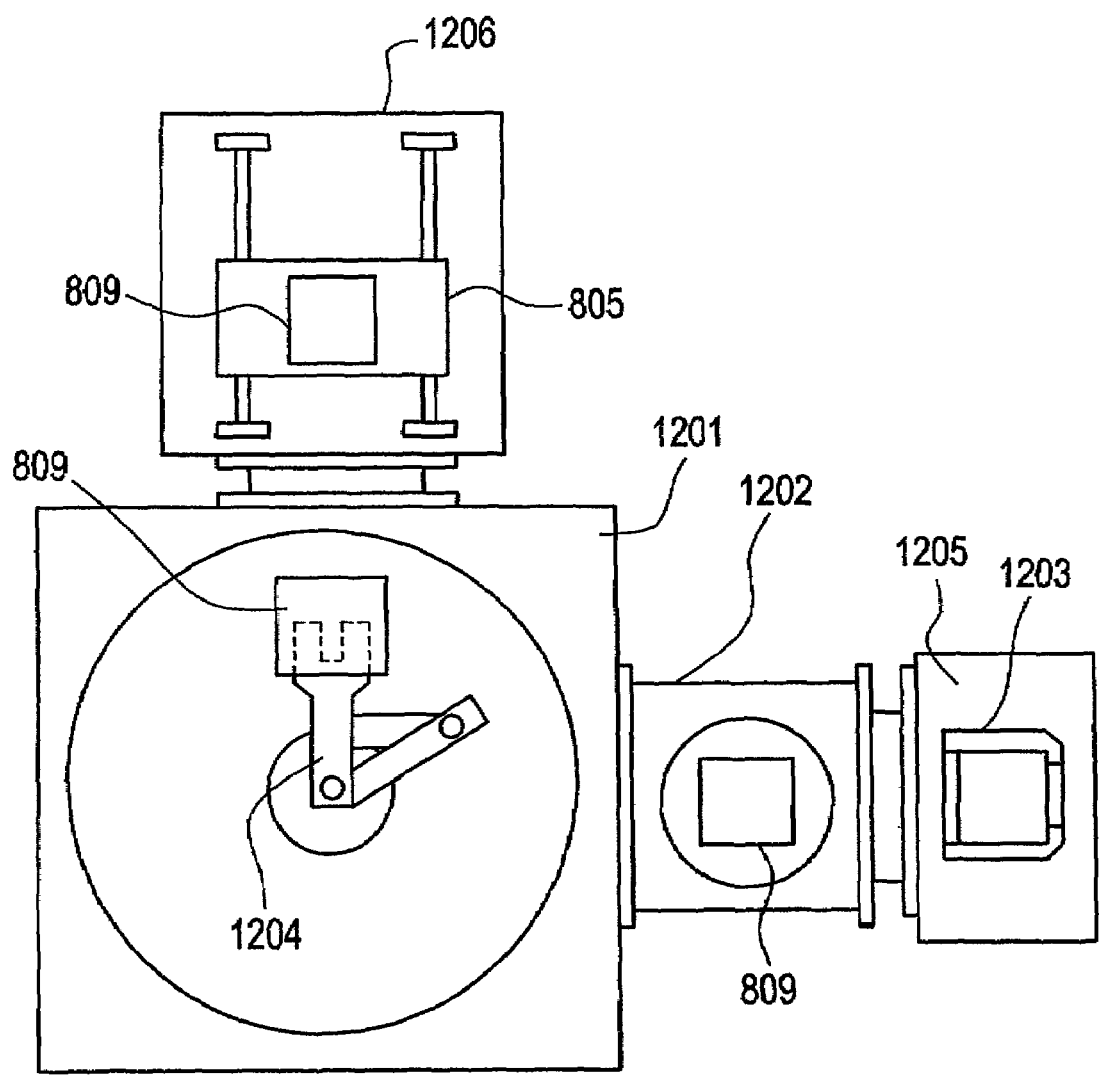

[FIG. 12] A view showing a laser irradiation system according to the present invention.

Figure 13:
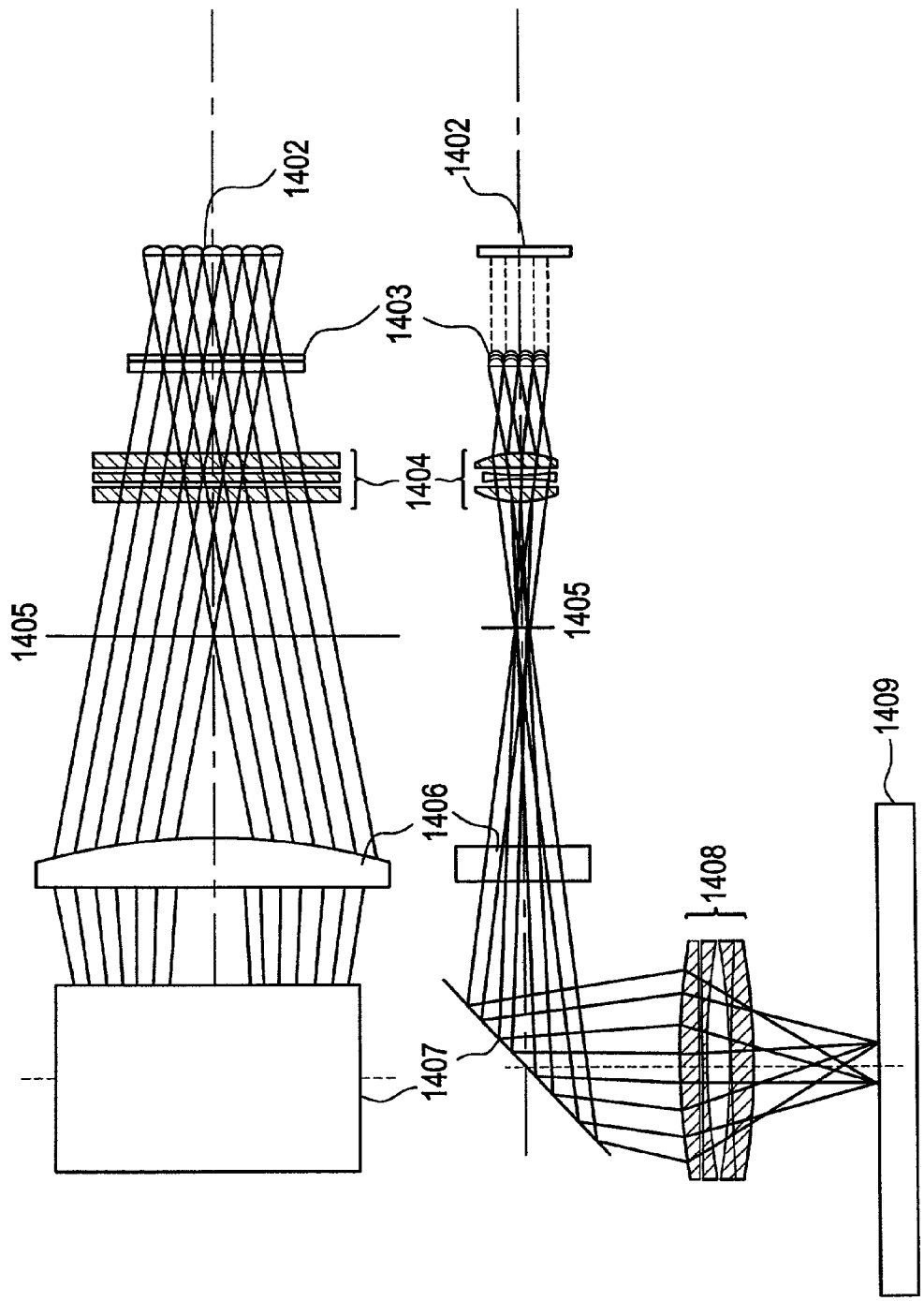

[FIG. 13] A view showing an optical system and optical path according to the present invention, for forming a linear laser beam.

Figure 14:
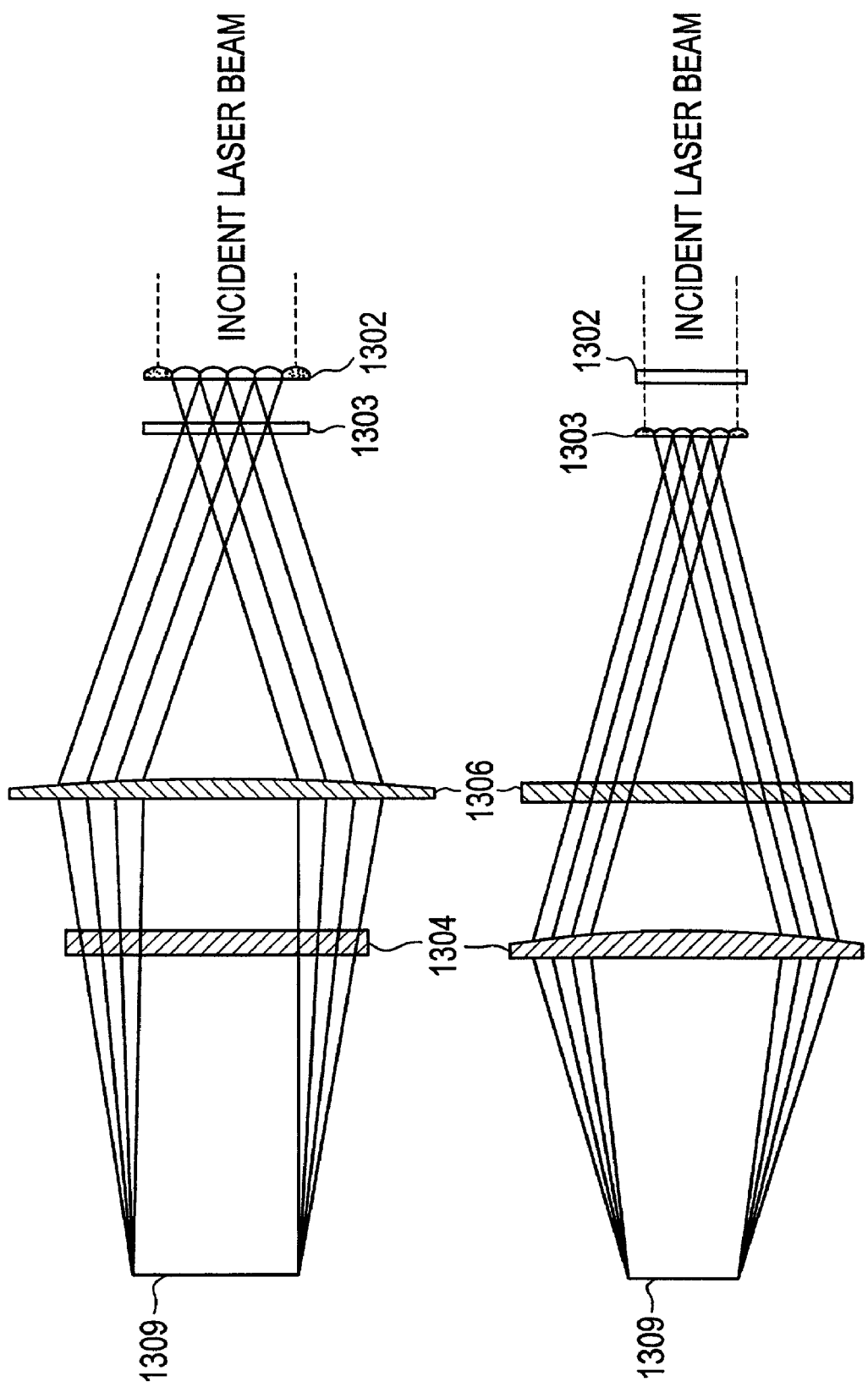
Figure 15A:
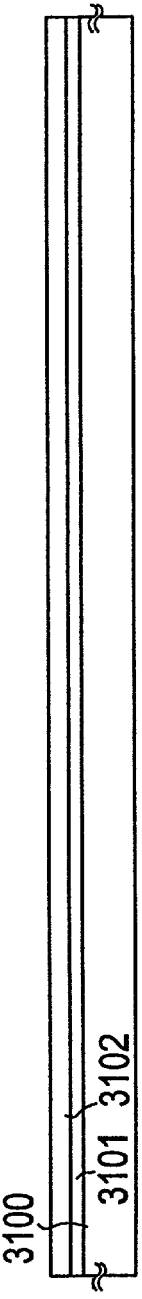
Figure 15B:
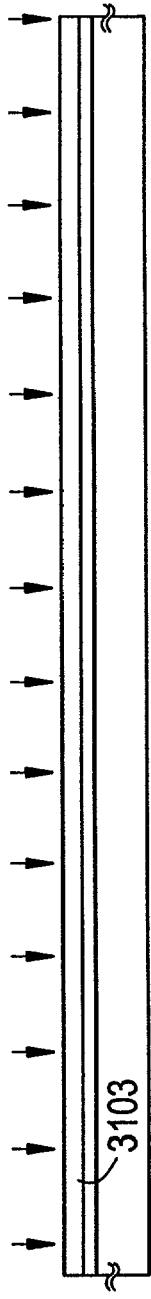
Figure 15C:
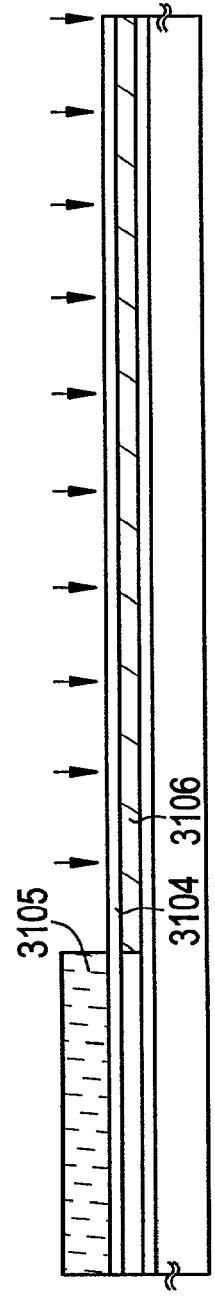
Figure 15D:
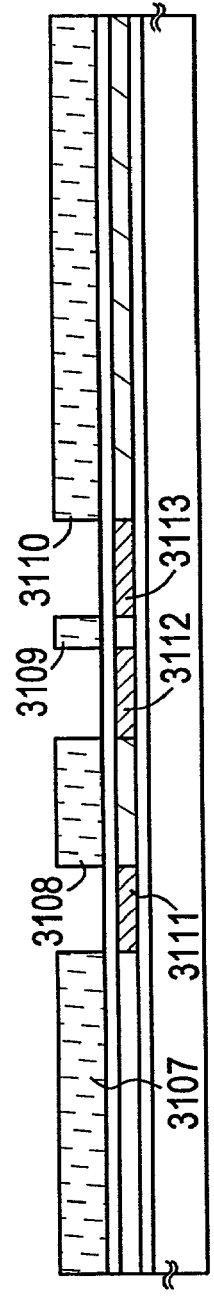
Figure 15E:
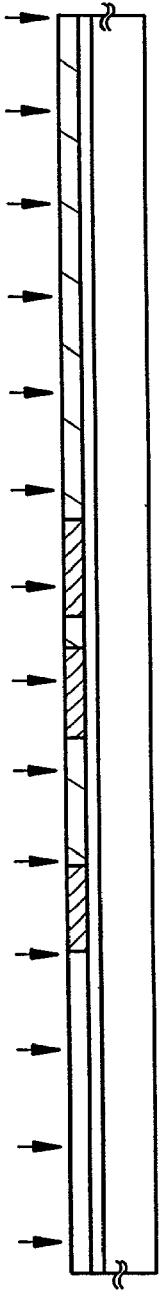
Figure 15F:
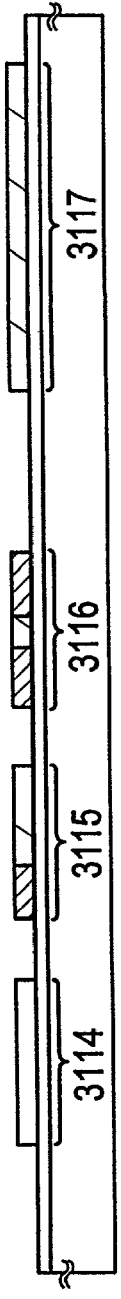
Figure 16A:
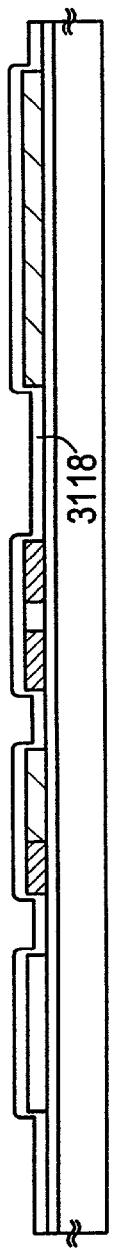
Figure 16B:
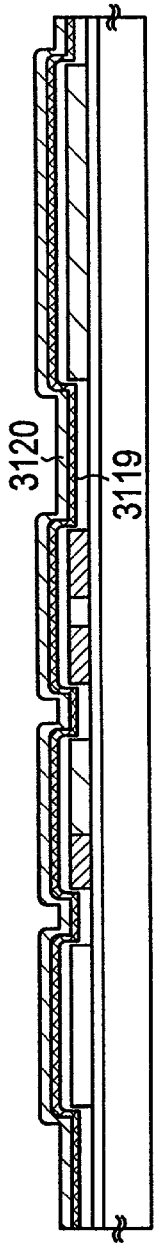
Figure 16C:
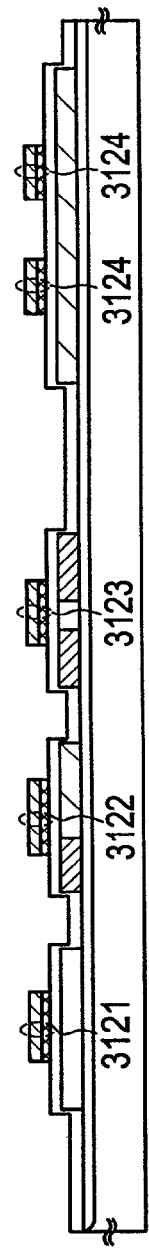
Figure 16D:
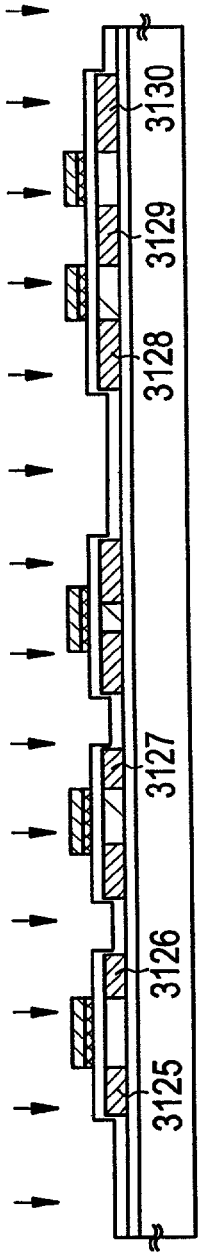
Figure 16E:
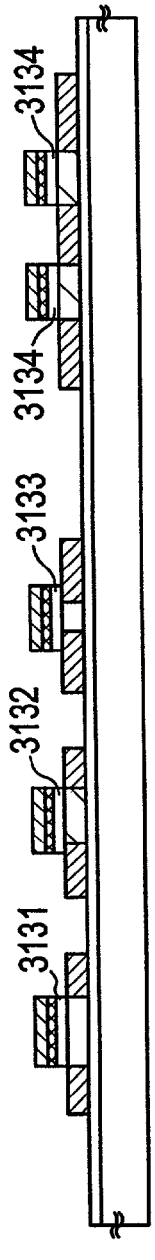
Figure 16F:
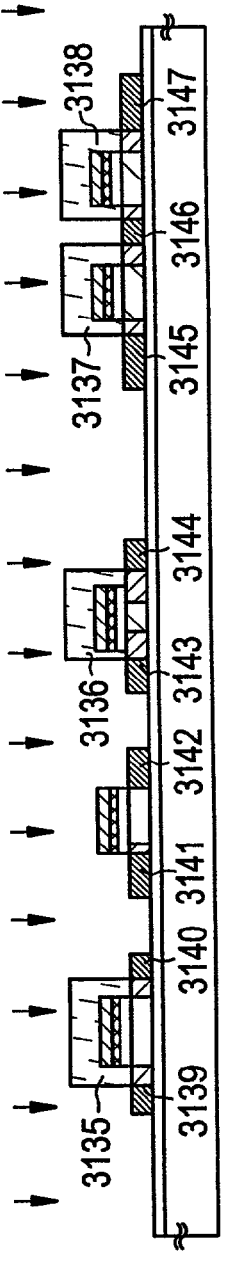

[FIG. 14] A view showing an optical system and optical path according to the present invention, for processing a laser beam into square shape.

[FIGS. 15A-15F] Views showing manufacturing steps of a pixel circuit and a control circuit.

[FIGS. 16A-16F] Views showing manufacturing steps of a pixel circuit and a control circuit.

Figure 17A:
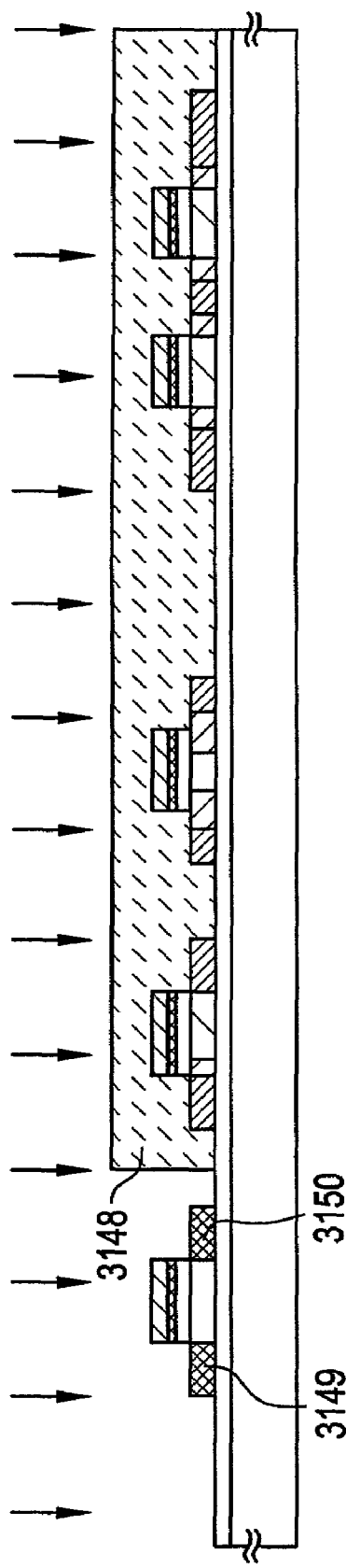
Figure 17B:
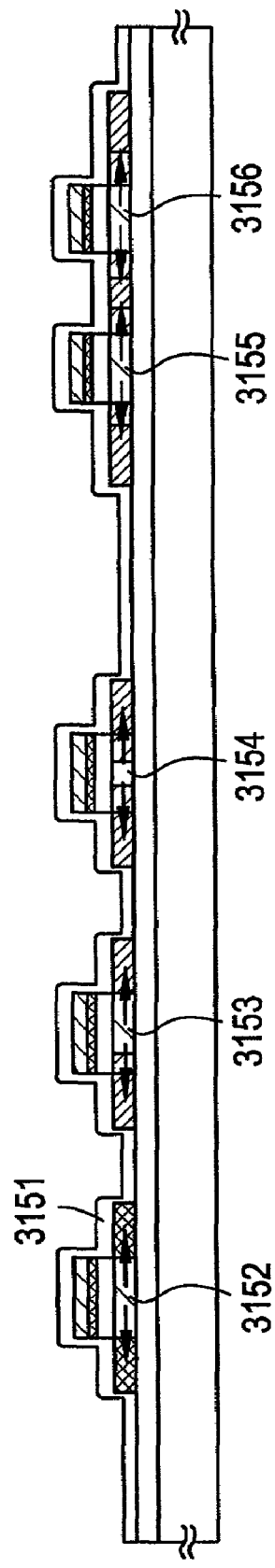
Figure 17C:
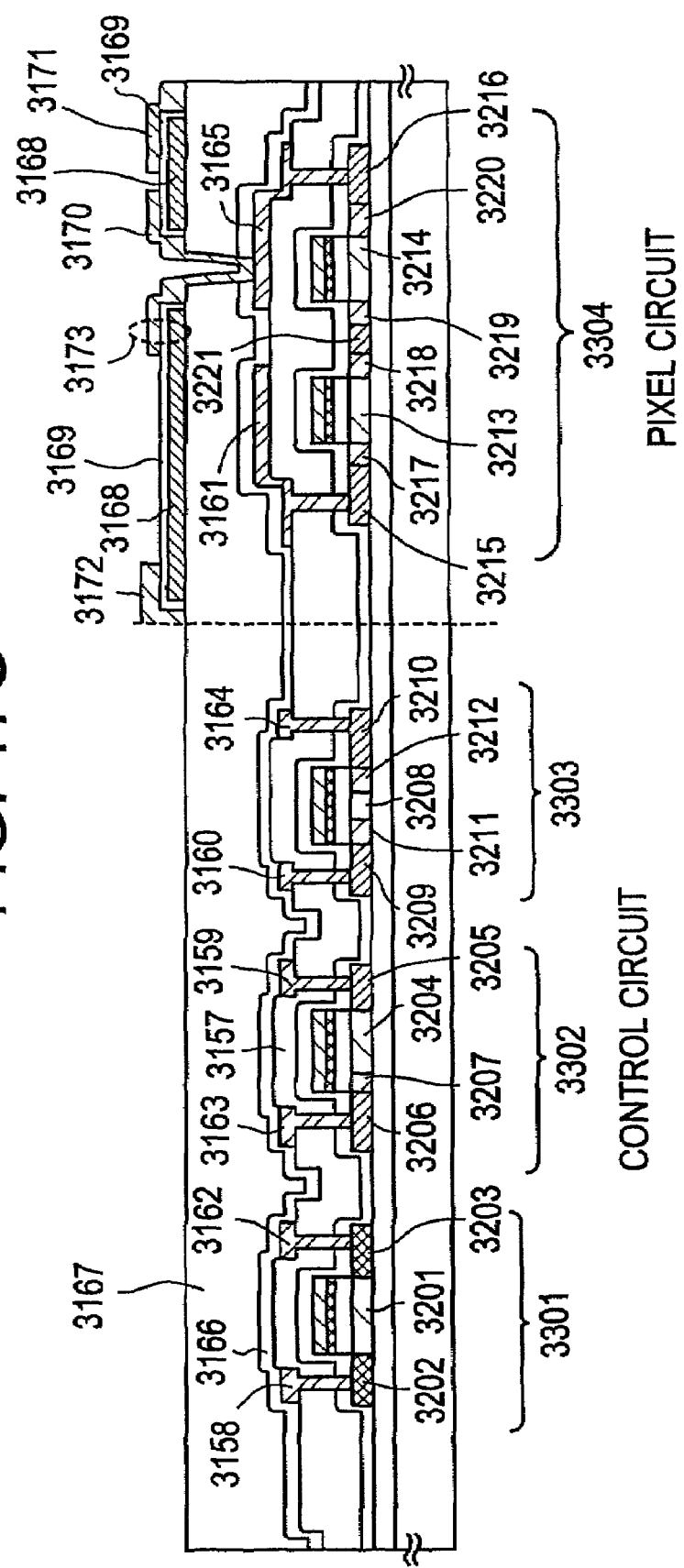

[FIGS. 17A-17C] Views showing manufacturing steps of a pixel circuit and a control circuit.

Figure 18:
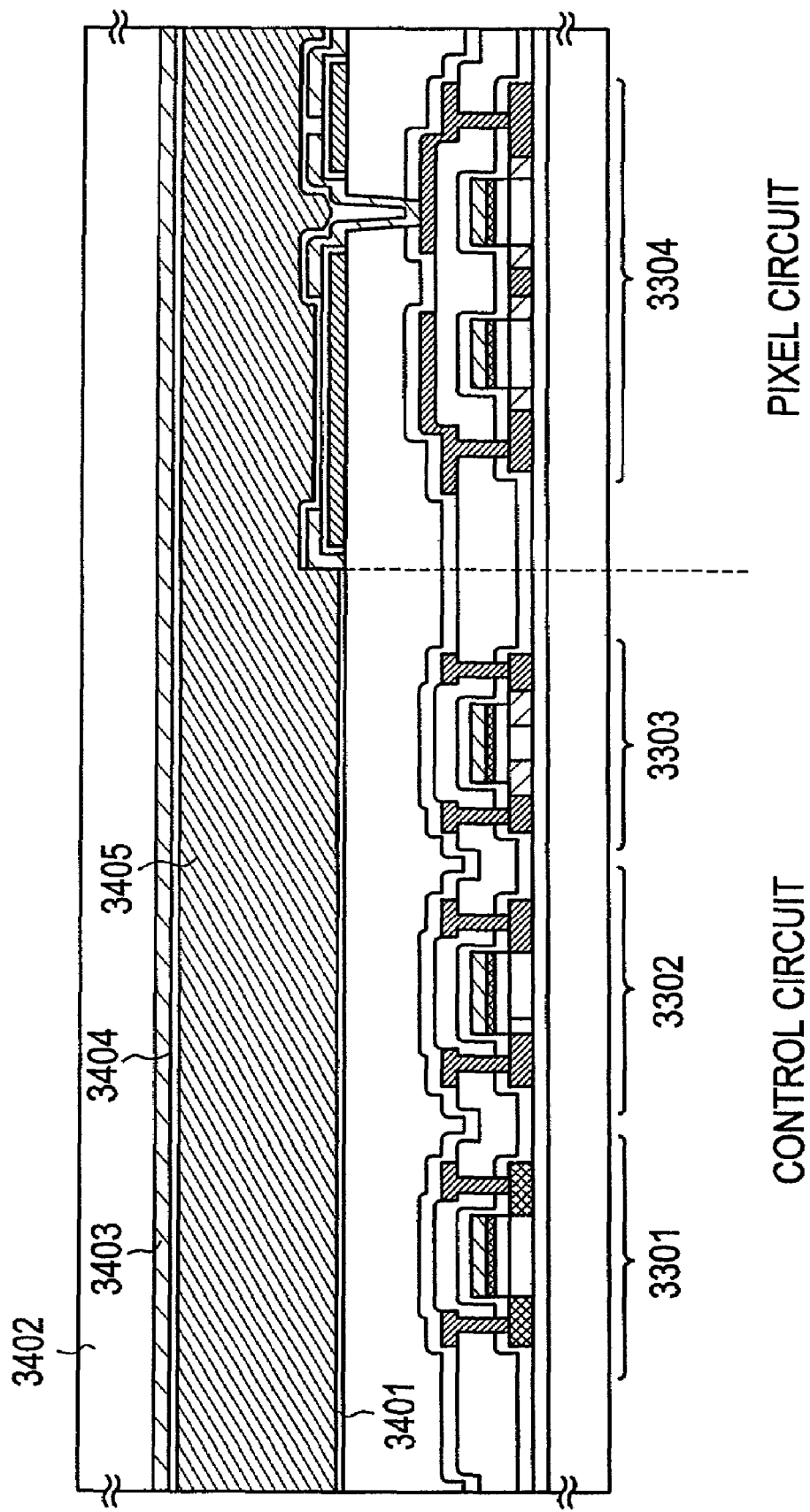

[FIG. 18] A sectional structural view of an active matrix type liquid crystal display device.

Figure 19:
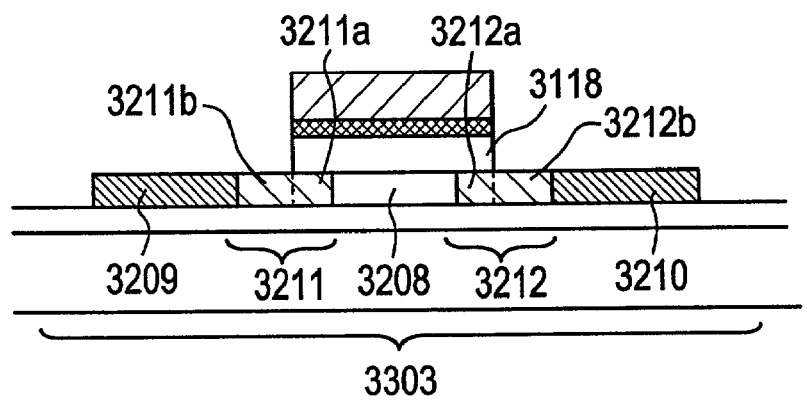

[FIG. 19] A view showing an LDD structure of an n-channel TFT.

Figure 20:
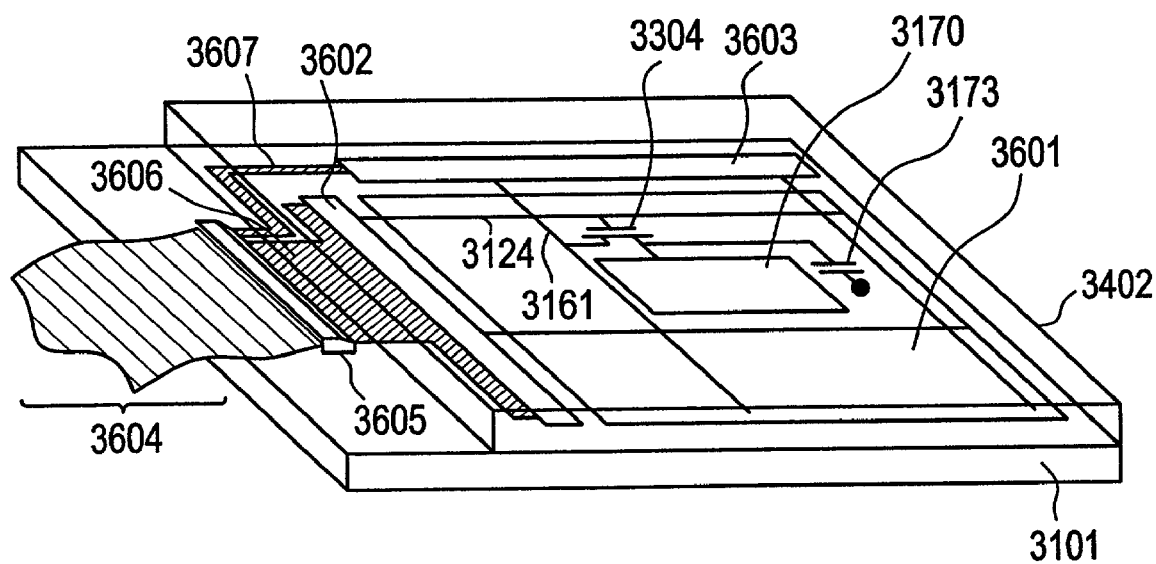

[FIG. 20] A perspective view of an active matrix type liquid crystal display device.

Figure 21:
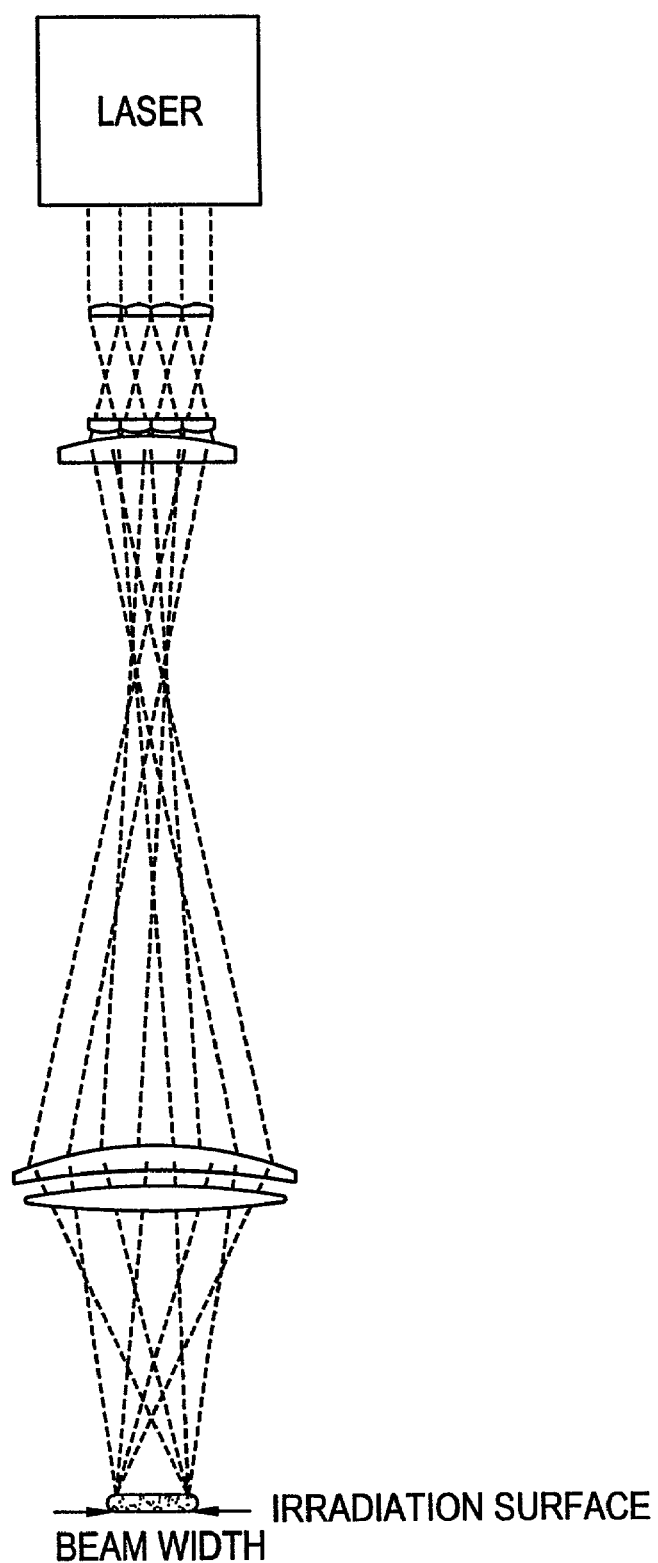

[FIG. 21] A view showing an optical system having no reflecting mirror.

Figure 22:
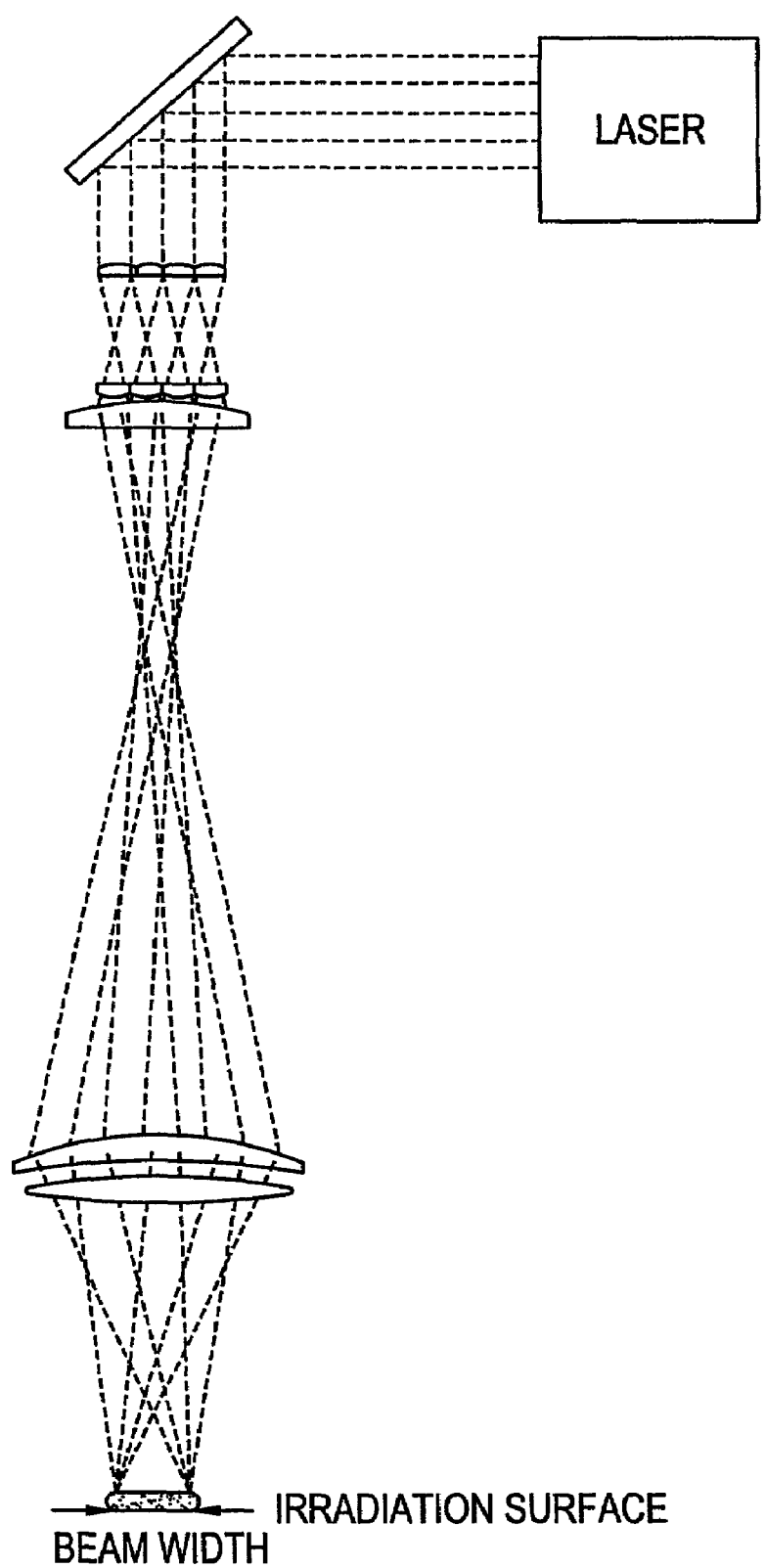

[FIG. 22] A view showing an optical system in which a position of a reflecting mirror to be brought in, is changed.

[FIGS. 23A-23F] Views showing examples of electronic equipments to which the present invention is applied.

[FIGS. 24A-24D] Views showing examples of projectors to which the present invention is applied.

The invention claimed is:

1. A method of fabricating a semiconductor device comprising:
    removing at least one edge of a first laser beam, thereby forming a second laser beam having a straight line extending in a first direction;
    dividing the second laser beam in a second direction vertical to the first direction by passing the second laser beam through a cylindrical lens group comprising a plurality of cylindrical lenses so that the straight line is parallel with the boundaries between the cylindrical lenses of the cylindrical lens group;
    condensing the divided laser beams; and
    irradiating a semiconductor film with the condensed laser beam.

2. A method according to claim 1, wherein said first laser beam is selected from the group consisting of KrF, XeCl, ArF, KrCl, Ar, YAG, and $CO_2$ laser beams.

3. A method according to claim 1, wherein said removing is performed by using a slit.

4. A method according to claim 3, wherein the slit comprises a material selected from the group consisting of glass, quartz ground glass, ceramic, and metal.

5. A method according to claim 1, wherein said semiconductor film is crystallized by said irradiating with the condensed laser beam.

6. A method according to claim 1, wherein impurities in said semiconductor film are activated by said irradiating with the condensed laser beam.

7. A method according to claim 1, wherein said condensing is performed using at least one of a triplet type symmetrical lens and a Tessar type symmetrical lens.

8. A method according to claim 1, wherein said semiconductor device is an electronic equipment selected from the group consisting of a video camera, a digital camera, a rear-type projector, a front-type projector, a head mount display, a goggle-type display, a navigation system for vehicles, a personal computer, a portable information terminal, a mobile computer, a cellular phone, and an electronic book.

9. A method of fabricating a semiconductor device comprising:
removing at least one edge of a laser beam, thereby forming a second laser beam having a straight line extending in a first direction;
dividing the second laser beam in a second direction vertical to the first direction by passing the second laser beam through a cylindrical lens group comprising a plurality of cylindrical lenses so that the straight line is coincident with the boundaries between the cylindrical lenses of the cylindrical lens group;
condensing the divided laser beams; and
irradiating a semiconductor film with the condensed laser beam.

10. A method according to claim 9, wherein said first laser beam is selected from the group consisting of KrF, XeCl, ArF, KrCl, Ar, YAG, and $CO_2$ laser beams.

11. A method according to claim 9, wherein said removing is performed by using a slit.

12. A method according to claim 11, wherein the slit comprises a material selected from the group consisting of glass, quartz ground glass, ceramic, and metal.

13. A method according to claim 9, wherein said condensing is performed using at least one of a triplet type symmetrical lens and a Tessar type symmetrical lens.

14. A method according to claim 9, wherein said semiconductor film is crystallized by said irradiating with the condensed laser beam.

15. A method according to claim 9, wherein impurities in said semiconductor film are activated by said irradiating with the condensed laser beam.

16. A method according to claim 9, wherein said semiconductor device is an electronic equipment selected from the group consisting of a video camera, a digital camera, a rear-type projector, a front-type projector, a head mount display, a goggle-type display, a navigation system for vehicles, a personal computer, a portable information terminal, a mobile computer, a cellular phone, and an electronic book.

17. A method according to claim 9, wherein the removing is performed by using both ends of the cylindrical lenses in the cylindrical lens group, the both ends of the cylindrical lenses comprising quartz ground glass.

18. A method of fabricating a semiconductor device comprising:

removing at least one edge of a first laser beam, thereby forming a second laser beam having a straight line extending in a first direction;
dividing the second laser beam in a second direction vertical to the first direction by passing the second laser beam through a cylindrical lens group comprising a plurality of cylindrical lenses so that the straight line is parallel with the boundaries between the cylindrical lenses of the cylindrical lens group;
condensing the divided laser beams; and
scanning a semiconductor film with the condensed laser beam in the second direction.

19. A method according to claim 18, wherein said first laser beam is selected from the group consisting of KrF, XeCl, ArF, KrCl, Ar, YAG, and $CO_2$ laser beams.

20. A method according to claim 18, wherein said removing is performed by using a slit.

21. A method according to claim 20, wherein the slit comprises a material selected from the group consisting of glass, quartz ground glass, ceramic, and metal.

22. A method according to claim 18, wherein said condensing is performed using at least one of a triplet type symmetrical lens and a Tessar type symmetrical lens.

23. A method according to claim 18, wherein said semiconductor film is crystallized by said scanning with the condensed laser beam.

24. A method according to claim 18, wherein impurities in said semiconductor film are activated by said scanning with the condensed laser beam.

25. A method according to claim 18, wherein said semiconductor device is an electronic equipment selected from the group consisting of a video camera, a digital camera, a rear-type projector, a front-type projector, a head mount display, a goggle-type display, a navigation system for vehicles, a personal computer, a portable information terminal, a mobile computer, a cellular phone, and an electronic book.

26. A method of fabricating a semiconductor device comprising:
removing at least one edge of a first laser beam, thereby forming a second laser beam having a straight line extending in a first direction;
dividing the second laser beam in a second direction vertical to the first direction by passing the second laser beam through a cylindrical lens group comprising a plurality of cylindrical lenses so that the straight line is coincident with the boundaries between the cylindrical lenses of the cylindrical lens group;
condensing the divided laser beams; and
scanning a semiconductor film with the condensed laser beam in the second direction.

27. A method according to claim 26, wherein said first laser beam is selected from the group consisting of KrF, XeCl, ArF, KrCl, Ar, YAG, and $CO_2$ laser beams.

28. A method according to claim 26, wherein said removing is performed by using a slit.

29. A method according to claim 28, wherein the slit comprises a material selected from the group consisting of glass, quartz ground glass, ceramic, and metal.

30. A method according to claim 26, wherein said semiconductor film is crystallized by said scanning with the condensed laser beam.

31. A method according to claim 26, wherein impurities in said semiconductor film are activated by said scanning with the condensed laser beam.

32. A method according to claim 26, wherein said condensing is performed using at least one of a triplet type symmetrical lens and a Tessar type symmetrical lens.

33. A method according to claim 26, wherein said semiconductor device is an electronic equipment selected from the group consisting of a video camera, a digital camera, a rear-type projector, a front-type projector, a head mount display, a goggle-type display, a navigation system for vehicles, a personal computer, a portable information terminal, a mobile computer, a cellular phone, and an electronic book.

34. A method according to claim 26, wherein the removing is performed by using both ends of the cylindrical lenses in the cylindrical lens group, the both ends of the cylindrical lenses comprising quartz ground glass.

35. A method of fabricating a semiconductor device comprising:
removing at least one edge of a first laser beam by using a slit, thereby forming a second laser beam having a straight line extending in a first direction;
dividing the second laser beam in a second direction vertical to the first direction by passing the second laser beam through a cylindrical lens group comprising a plurality of cylindrical lenses so that the straight line is parallel with the boundaries between the cylindrical lenses of the cylindrical lens group;
condensing the divided laser beams; and
irradiating a semiconductor film with the condensed laser beam.

36. A method of fabricating a semiconductor device comprising:
removing at least one edge of a laser beam, thereby forming a second laser beam having a straight line extending in a first direction;
dividing the second laser beam in a second direction vertical to the first direction by passing the second laser beam through a cylindrical lens group comprising a plurality of cylindrical lenses so that the straight line is coincident with the boundaries between the cylindrical lenses of the cylindrical lens group;
condensing the divided laser beams; and
irradiating a semiconductor film with the condensed laser beam.

37. A method of fabricating a semiconductor device comprising:
removing at least one edge of a first laser beam by using a slit, thereby forming a second laser beam having a straight line extending in a first direction;
dividing the second laser beam in a second direction vertical to the first direction by passing the second laser beam through a cylindrical lens group comprising a plurality of cylindrical lenses so that the straight line is parallel with the boundaries between the cylindrical lenses of the cylindrical lens group;
condensing the divided laser beams; and
scanning a semiconductor film with the condensed laser beam in the second direction.

38. A method of fabricating a semiconductor device comprising:
removing at least one edge of a first laser beam by using a slit, thereby forming a second laser beam having a straight line extending in a first direction;
dividing the second laser beam in a second direction vertical to the first direction by passing the second laser beam through a cylindrical lens group comprising a plurality of cylindrical lenses so that the straight line is coincident with the boundaries between the cylindrical lenses of the cylindrical lens group;
condensing the divided laser beams; and
scanning a semiconductor film with the condensed laser beam in the second direction.

39. A method according to any one of claims 35 to 38, wherein said first laser beam is selected from the group consisting of KrF, XeCl, ArF, KrCl, Ar, YAG, and $CO_2$ laser beams.

40. A method according to any one of claims 35 and 36, wherein said semiconductor film is crystallized by said irradiating with the condensed laser beam.

41. A method according to any one of claims 35 and 36, wherein impurities in said semiconductor film are activated by said irradiating with the condensed laser beam.

42. A method according to any one of claims 35 to 38 wherein said condensing is performed using at least one of a triplet type symmetrical lens and a Tessar type symmetrical lens.

43. A method according to any one of claims 35 to 38, wherein said semiconductor device is an electronic equipment selected from the group consisting of a video camera, a digital camera, a rear-type projector, a front-type projector, a head mount display, a goggle-type display, a navigation system for vehicles, a personal computer, a portable information terminal, a mobile computer, a cellular phone, and an electronic book.

44. A method according to any one of claims 36 and 38, wherein the removing is performed by using both ends of the cylindrical lenses in the cylindrical lens group, the both ends of the cylindrical lenses comprising quartz ground glass.

45. A method according to any one of claims 35 to 38, wherein the slit comprises a material selected from the group consisting of glass, quartz ground glass, ceramic, and metal.

46. A method according to any one of claims 9, 26, 36 and 38, wherein the cylindrical lens group is shorter than the width of the laser beam.

47. A method according to any one of claims 37 and 38, wherein said semiconductor film is crystallized by said scanning with the condensed laser beam.

48. A method according to any one of claims 37 and 38, wherein impurities in said semiconductor film are activated by said scanning with the condensed laser beam.

* * * * *